(12) United States Patent
Ellis et al.

(10) Patent No.: US 10,194,642 B2
(45) Date of Patent: Feb. 5, 2019

(54) BIRD FEEDER

(71) Applicant: Syll Innovations, LLC, Poughkeepsie, NY (US)

(72) Inventors: Lisa Marie Ellis, Marlboro, NY (US); Dennis Gerard Ellis, Marlboro, NY (US)

(73) Assignee: Syll Innovations, LLC, Poughkeepsie, NY (US)

( * ) Notice: Subject to any disclaimer, the term of this patent is extended or adjusted under 35 U.S.C. 154(b) by 190 days.

(21) Appl. No.: 15/228,642

(22) Filed: Aug. 4, 2016

(65) Prior Publication Data
US 2018/0035650 A1 Feb. 8, 2018

(51) Int. Cl.
| | |
|---|---|
| *A01K 39/04* | (2006.01) |
| *A01K 39/01* | (2006.01) |
| *A01K 39/02* | (2006.01) |
| *B33Y 80/00* | (2015.01) |

(52) U.S. Cl.
CPC .......... *A01K 39/04* (2013.01); *A01K 39/0106* (2013.01); *A01K 39/0206* (2013.01); *B33Y 80/00* (2014.12)

(58) Field of Classification Search
CPC .... A01K 39/00; A01K 39/0106; A01K 39/01; A01K 1/0356; A47L 3/02; A47G 7/044; E06B 7/28; E06B 7/285; A47H 27/00
USPC ........................................................ 119/484
See application file for complete search history.

(56) References Cited

U.S. PATENT DOCUMENTS

| | | | | |
|---|---|---|---|---|
| 1,446,231 A | * | 2/1923 | West | A47H 27/00 108/42 |
| 1,448,235 A | * | 3/1923 | Read | E06B 7/28 312/263 |
| 1,512,792 A | * | 10/1924 | Nelson | A47L 3/02 182/113 |
| 1,543,739 A | * | 6/1925 | Vowels | E06B 7/28 312/101 |
| 2,430,541 A | | 11/1947 | Thatcher | |
| D194,109 S | | 11/1962 | Dilley | |
| 3,086,499 A | | 4/1963 | Dilley | |

(Continued)

FOREIGN PATENT DOCUMENTS

| | | |
|---|---|---|
| CN | 202 680 217 U | 1/2013 |
| WO | WO 2018/027120 A1 | 2/2018 |

OTHER PUBLICATIONS

International Search Report and Written Opinion for Application No. PCT/US2017/045474 dated Oct. 26, 2017.

(Continued)

*Primary Examiner* — Kristen C Hayes
(74) *Attorney, Agent, or Firm* — Jenkins, Wilson, Taylor & Hunt, P.A.

(57) ABSTRACT

Provided herein are bird feeders configured to be positioned on an exterior window sill ledge and readily observed and maintained from the comfort of a home. The bird feeders provided herein can in some embodiments comprise a basin or other container (and optional cover) for holding and/or providing bird seed and/or feed and a compression pad configured to be compressed between a closed window and the window sill to thereby secure the feeder in place on the exterior window sill ledge. In some embodiments adjustable support members can be provided to permit the feeder to be leveled or placed in a substantially level position on an exterior window sill ledge. To refill and/or maintain the feeder a user can access the feeder simply by opening the window from the inside of the home or dwelling.

34 Claims, 8 Drawing Sheets

(56) References Cited

U.S. PATENT DOCUMENTS

| | | | |
|---|---|---|---|
| 3,089,461 | A | 5/1963 | Dunn |
| D198,568 | S | 7/1964 | Clever |
| 3,211,130 | A | 10/1965 | Prince |
| 3,282,251 | A | 11/1966 | Dahmus |
| 3,291,100 | A * | 12/1966 | Negaard ............... A01K 39/014 119/57.8 |
| D225,215 | S | 11/1972 | Francis |
| D237,730 | S | 11/1975 | Hansen et al. |
| 4,261,294 | A | 4/1981 | Bescherer |
| 4,335,547 | A | 6/1982 | Maxwell |
| 4,361,116 | A | 11/1982 | Kilham |
| 4,637,344 | A | 1/1987 | Peterson |
| 4,649,865 | A | 3/1987 | Riggi |
| D302,751 | S | 8/1989 | Baldwin |
| D302,752 | S | 8/1989 | Baldwin |
| 4,881,491 | A * | 11/1989 | Brown ................... A01K 39/00 119/51.01 |
| 4,892,060 | A | 1/1990 | Lundquist |
| D308,495 | S | 6/1990 | Honeycutt |
| 5,016,571 | A | 5/1991 | Totaro |
| D350,627 | S | 9/1994 | Moniak |
| D351,690 | S | 10/1994 | Honeycutt |
| 5,469,807 | A * | 11/1995 | Kosmaczeska ........ A01K 1/033 119/484 |
| D381,135 | S | 7/1997 | Hochlan, Jr. |
| D396,331 | S | 7/1998 | Niemetz |
| D407,863 | S | 4/1999 | Leal et al. |
| 5,904,330 | A | 5/1999 | Manico et al. |
| 6,062,167 | A | 5/2000 | Soley |
| 6,314,912 | B1 | 11/2001 | Armbruster |
| 6,334,407 | B1 | 1/2002 | Schneider |
| 6,857,394 | B2 | 2/2005 | Redford |
| D515,246 | S | 2/2006 | Lory, II |
| D522,185 | S | 5/2006 | Donegan |
| 7,162,972 | B2 | 1/2007 | Stachowiak |
| D561,955 | S | 2/2008 | Mc Donough |
| D566,906 | S | 4/2008 | Rogers |
| 7,392,763 | B2 | 7/2008 | Willinger et al. |
| D658,338 | S | 4/2012 | Law |
| 2006/0137618 | A1 | 6/2006 | Poirier et al. |
| 2007/0169706 | A1 | 7/2007 | Vagedes et al. |
| 2010/0175630 | A1 | 7/2010 | Stetson |
| 2015/0342153 | A1 | 12/2015 | Hudepohl |
| 2016/0165855 | A1 | 6/2016 | MacKelvie |

OTHER PUBLICATIONS

"Window Bird Feeders," Duncraft, Wild Bird Superstore, www.duncraft.com/Window-Bird-Feeders?view_all (2017). [Retrieved Jan. 6, 2017].

"Mirrored Windowsill Feeder, Item No. 25900," Coveside Conservation Products, Casco, Maine 04015, https://www.coveside.com/_store/card_view.asp?itemnr=25900 (Date Unknown). [Retrieved Jan. 6, 2017].

Watchers Choice™ Feeders: World's Best Window Feeder, http://www.watcherschoice.com/ (2013). [Retrieved Jan. 6, 2017].

"Birding Company 78621 Songview In-House Window Feeder—Natural," GoSale: Compare & Save, America's Largest Price Comparison Website, http://www.gosale.com/4483766/birding-company-78621 (2017). [Retrieved Jan. 6, 2017].

"Panoramic In-House Window Feeder, Item No. 26400," Coveside Conservation Products, Casco, Maine 04015, https://www.coveside.com/_store/card_view.asp?itemnr=26400 (Date Unknown). [Retrieved Jan. 6, 2017].

"Mirrored Panoramic In-House Window Feeder, Item No. 26500," Coveside Conservation Products, Casco, Maine 04015, https://www.coveside.com/_store/card_view.asp?itemnr=26500 (Date Unknown). [Retrieved Jan. 6, 2017].

"Bread Box Window Feeder, Item No. 27000," Coveside Conservation Products, Casco, Maine 04015, https://www.coveside.com/_store/card_view.asp?itemnr=27000 (Date Unknown). [Retrieved Jan. 6, 2017].

"Bread Box Window Feeder with 2-way Mirror, Item No. 27500," Coveside Conservation Products, Casco, Maine 04015, https://www.coveside.com/_store/card_view.asp?itemnr=27500 (Date Unknown). [Retrieved Jan. 6, 2017].

Restriction Requirement for U.S. Appl. No. 29/573,349 dated Mar. 28, 2018.

Notice of Publication for Application No. PCT/US2017/045474 dated Feb. 8, 2018.

Notice of Certification of Registration for Canadian Application No. 172031 dated May 7, 2018.

Notice of Allowance for U.S. Appl. No. 29/573,349 dated Jun. 21, 2018.

Certificate of registration for European Design Application No. 003522150-001 dated Dec. 16, 2016.

Certificate of registration for European Design Application No. 003522150-002 dated Dec. 16, 2016.

Certificate of registration for European Design Application No. 003522150-003 dated Dec. 16, 2016.

Certificate of registration for European Design Application No. 003522150-004 dated Dec. 16, 2016.

Certificate of registration for European Design Application No. 003522150-005 dated Dec. 16, 2016.

Certificate of registration for European Design Application No. 003522150-006 dated Dec. 16, 2016.

Certificate of registration for European Design Application No. 003522150-007 dated Dec. 16, 2016.

* cited by examiner

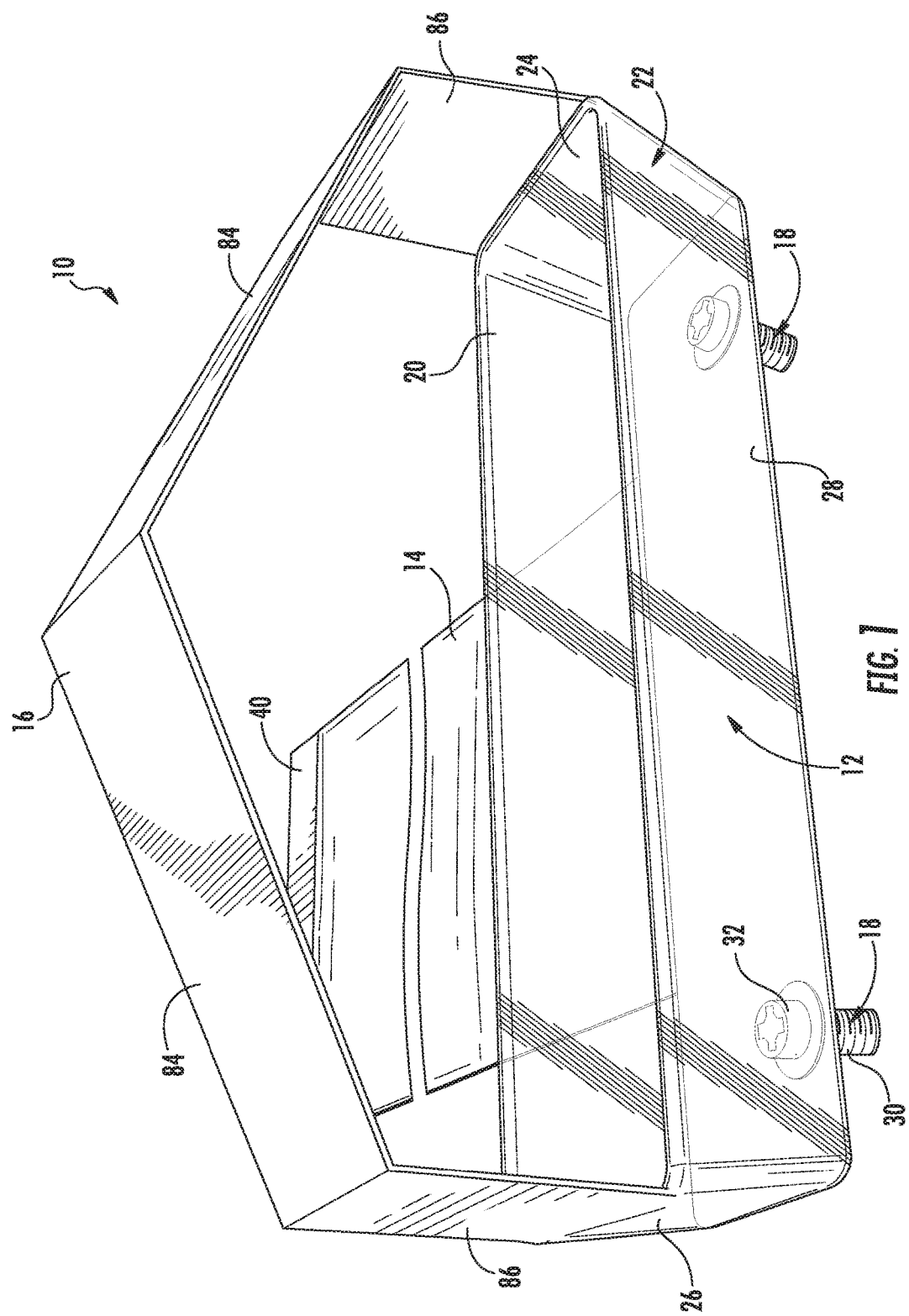

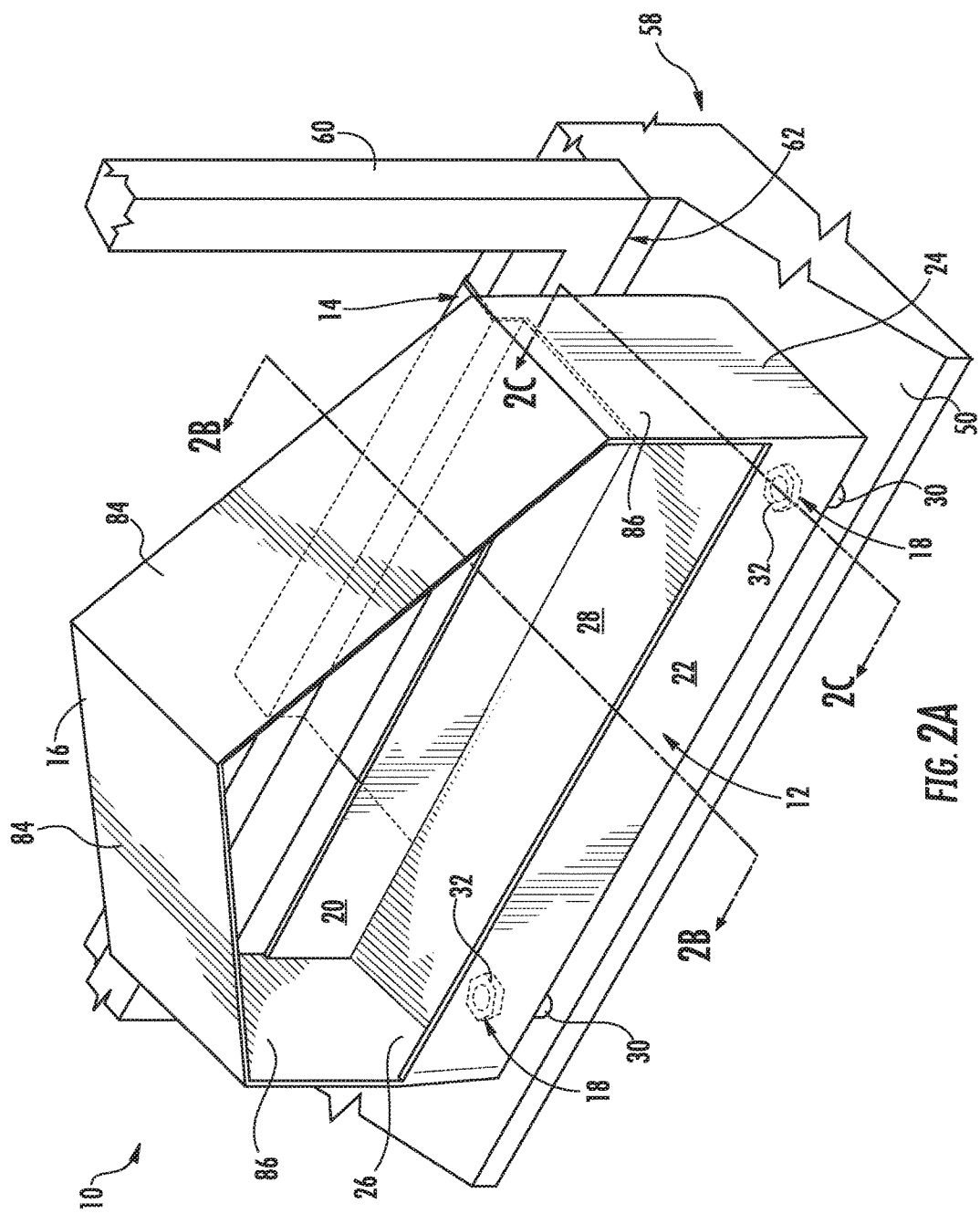

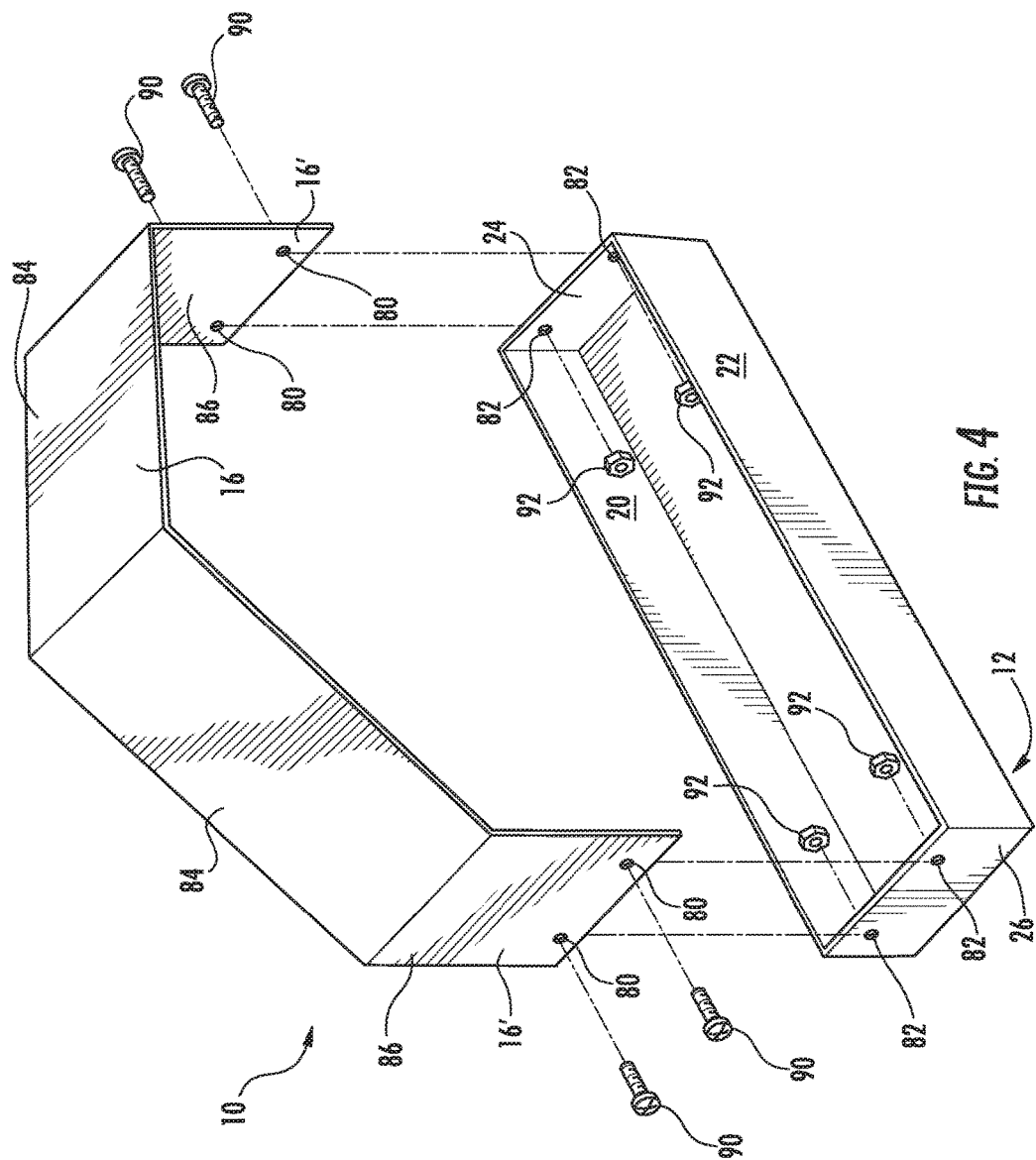

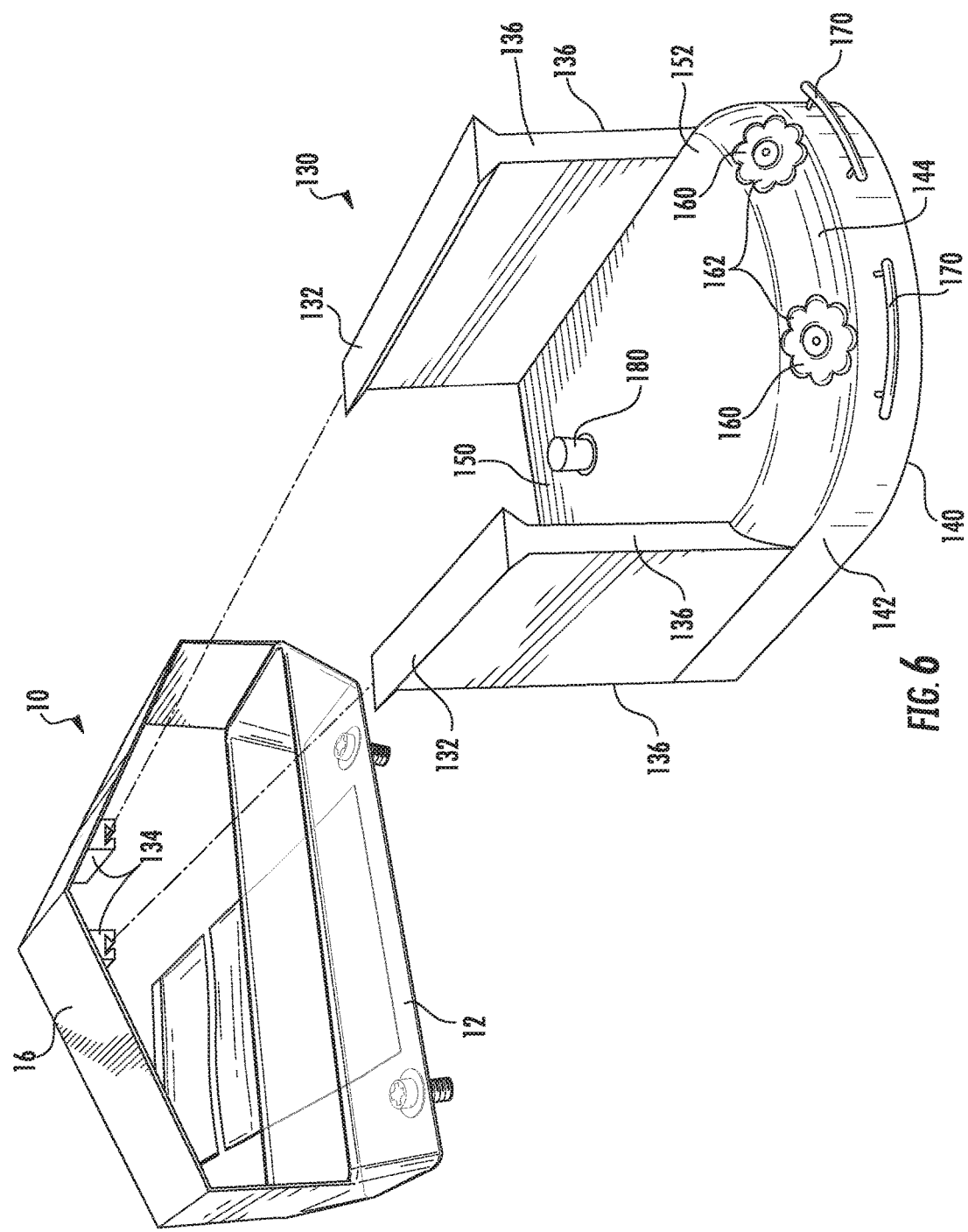

BIRD FEEDER

TECHNICAL FIELD

The presently disclosed subject matter relates to devices, apparatuses, systems and methods for feeding, observing and caring for birds. The presently disclosed subject matter also relates to the use of bird feeders and related devices configured to provide a feeding system for avian species.

BACKGROUND

Bird watching, or birding, is a worldwide recreational and educational activity that includes the observation of birds by the naked eye, through a visual enhancement device like binoculars and telescopes, or by listening for bird sounds. The observation of birds and other wildlife can often times be enhanced by providing food to attract the birds to a desired location, including private residences, office buildings, parks and the like. Bird watchers and wildlife enthusiasts find enjoyment in observing and providing food for these wild avian species.

There are currently numerous bird feeding devices available in the marketplace. Many provide desirable features intended to enhance the enjoyment of feeding and observing birds. However, most of the currently available bird feeder designs require a user to go outside of a residence or dwelling, or precariously hang outside of a window, to attend to the feeder and replenish food sources. During inclement weather, and/or for elderly or disabled persons or those residing on the upper floors of buildings, such may not be desirable or even possible. Moreover, in some instances it can be beneficial to have a feeder positioned near a window to facilitate up-close bird watching from the indoors through the window.

Thus, a need remains for devices, apparatuses, systems and methods for feeding, observing and caring for birds. Particularly, what is needed is an effective and reliable bird feeder that can be easily and safely installed, replenished, maintained and observed from indoors.

SUMMARY

The presently disclosed subject matter provides devices, apparatuses, systems and methods for feeding, observing and caring for birds. The presently disclosed subject matter also relates to the use of bird feeders and related devices configured to provide a feeding system for avian species.

In some embodiments provided herein are bird feeders comprising a basin comprising at least four sides and a bottom and configured to hold bird seed, a compression pad attached to the basin and extending from a bottom rear portion of the basin, and one or more adjustable support members extending from the bottom of the basin, wherein the bird feeder is configured to rest on an exterior window sill ledge on the outside of a window, wherein the compression pad is configured to be compressed between a closed window and a window sill to thereby secure the feeder in place on the exterior window sill ledge, and wherein the one or more adjustable support members are configured to support the feeder on the exterior window sill ledge and compensate for a downward slope of the exterior window sill ledge.

In some embodiments the basin comprises a rectangular structure configured as a trough-like structure with an interior space for holding bird seed and an open upper surface configured to allow access to the interior space. In some embodiments the basin comprises a clear plastic material. In some embodiments the one or more adjustable support members are integrated into the bottom of the basin, and comprise a threaded member configured to be adjustable in height. In some embodiments the bottom of the basin comprises one or more threaded openings configured to threadingly engage the one or more adjustable support members. In some embodiments the compression pad is permanently affixed to the bottom of the basin and extends in a planar direction away from a rear portion of the basin. In some embodiments the compression pad is secured to the bottom of the basin by an attachment element, wherein a length of the compression pad extending from the basin is adjustable.

In some embodiments the attachment element comprises a flat plate structure extending at least the width or more of the compression pad and comprising threaded holes configured to receive one or more threaded bolts, wherein threaded bolts extending through the bottom of the basin and threadably received in the threaded holes of the flat plate structure together are configured to secure the compression pad against the bottom of the basin. In some embodiments the compression pad comprises a sheet of material sufficiently flexible to be sandwiched between a closed window and a window sill yet sufficiently strong to securely hold the bird feeder in place. In some embodiments the compression pad can comprise a material selected from marine cloth, marine vinyl, silicone, plastic, leather, fabric, mesh or similar netting, yarn, twine, malleable metal, rubber, oil cloth, or any other similar and/or pliable material and combinations thereof. In some embodiments the compression pad further comprises a weight at a terminal end of the compression pad, wherein the weight is configured to cause the compression pad to drape over the window sill on the inside of the window.

In some embodiments the feeder further comprises a cover extending above the basin and configured to allow access to the basin from a front and rear portion of the basin. In some embodiments the cover and basin are molded as a single unitary piece. In some embodiments the cover and basin are separate pieces, wherein the cover is configured to be attached to the basin. In some embodiments the cover comprises a clear plastic material.

In some embodiments the feeders can further comprise a hummingbird feeder attachment, wherein the hummingbird feeder attachment comprises an attachment element configured to attach to the cover, a container configured to hold hummingbird food, and a feeding port configured to allow a hummingbird access to the hummingbird food. In some embodiments the hummingbird feeder attachment is configured to attach to an underside of the cover and suspend below the cover and above the basin. In some embodiments the attachment element comprises a rail configured to slidingly engage a track on an underside of the cover.

Provided herein in some embodiments are bird feeders comprising a basin comprising at least four sides and a bottom and configured to hold bird seed, a cover extending above the basin and configured to allow access to the basin from a front and rear portion of the basin, a compression pad attached to the basin and extending from a bottom rear portion of the basin, and one or more adjustable support members extending from the bottom of the basin, wherein the bird feeder is configured to rest on an exterior window sill ledge on the outside of a window, wherein the compression pad is configured to be compressed between a closed window and a window sill to thereby secure the feeder in place on the exterior window sill ledge, and wherein the one or more adjustable support members are configured to support the feeder on the exterior window sill ledge and compensate for a downward slope of the window sill, and wherein the basin, cover and compression pad are configured as a single unitary piece.

In some embodiments the basin, cover and compression pad are injection molded (or 3D printed or other suitable manufacturing technique) as a single unitary piece. In some embodiments the basin and cover comprise a clear plastic material.

Provided in some embodiments are bird feeder kits comprising a basin comprising at least four sides and a bottom and configured to hold bird seed, a cover configured to be attachable to the basin, a compression pad configured to be attachable to the basin, one or more adjustable support members configured to be adjustable from the top or bottom of the basin, hardware for attaching the cover and compression pad to the basin, instructions for assembling and using the bird feeder, wherein in the assembled condition the bird feeder is configured to rest on a window sill on the outside of a window, wherein the compression pad is configured to be compressed between a closed window and the window sill to thereby secure the bird feeder in place on the window sill, and wherein the one or more adjustable support members are configured to support the bird feeder on the window sill and compensate for a downward slope of the window sill. In some embodiments the bird feeder, in the assembled condition, is configured to be used in any double hung window having a window sill.

In some embodiments provided herein is a bird feeder comprising a block of compressed bird seed, and a compression pad attached to and extending from the block of compressed bird seed, wherein the bird feeder is configured to rest on an exterior window sill ledge on the outside of a window, wherein the compression pad is configured to be compressed between a closed window and a window sill to thereby secure the bird feeder in place on the exterior window sill ledge.

In some embodiments such a bird feeder can further comprise a base to which the block of compressed bird seed is affixed, wherein the compression pad is attached to and extends from a rear portion of the base in a substantially planar direction. In some embodiments such a bird feeder can further comprise one or more securing elements configured to secure the block of compressed bird seed to the base, wherein the securing elements extend from the base and into the block of compressed bird seed.

In some embodiments the compression pad comprises a sheet of material sufficiently flexible to be sandwiched between a closed window and a window sill yet sufficiently strong to securely hold the bird feeder in place. In some embodiments the compression pad comprises a material selected from marine cloth, marine vinyl, silicone, plastic, leather, fabric, mesh or similar netting, yarn, twine, malleable metal, rubber, oil cloth, or any other similar and/or pliable material. In some embodiments the block of compressed bird seed comprises feed, seed or bird feed that is edible by birds but retains a substantially solid shape until consumed by birds.

In some embodiments such a bird feeder can further comprise one or more adjustable support members extending from a bottom of the base, wherein the one or more adjustable support members are configured to support the feeder on an exterior window sill ledge and compensate for a downward slope of the exterior window sill ledge. In some embodiments the bird feeder is configured to be disposable once the bird seed is consumed or reusable by affixing a new compressed block onto the base.

In some embodiments provided herein is a bird feeder, comprising a bird feeder comprising a container to hold bird feed and configured to allow birds access to the bird feed, and a compression pad attached to and extending from the bird feeder, wherein the bird feeder is configured to rest on an exterior window sill ledge on the outside of a window, wherein the compression pad is configured to be compressed between a closed window and a window sill to thereby secure the bird feeder in place on the exterior window sill ledge. In some embodiments the compression pad comprises a sheet of material sufficiently flexible to be sandwiched between a closed window and a window sill yet sufficiently strong to securely hold the bird feeder in place. In some embodiments the compression pad comprises a material selected from marine cloth, marine vinyl, silicone, plastic, leather, fabric, mesh or similar netting, yarn, twine, malleable metal, rubber, oil cloth, or any other similar and/or pliable material and combinations thereof. In some embodiments the bird feeder further comprises one or more adjustable support members extending from a bottom of the bird feeder, wherein the one or more adjustable support members are configured to support the bird feeder on an exterior window sill ledge and compensate for a downward slope of the exterior window sill ledge.

An object of the presently disclosed subject matter having been stated hereinabove, and which is achieved in whole or in part by the presently disclosed subject matter, other objects will become evident as the description proceeds when taken in connection with the accompanying Examples as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which:

FIG. 1 is a perspective view of a bird feeder design as disclosed herein;

FIG. 4 is an exploded view of a bird feeder design as disclosed herein;

FIG. 6 illustrates a bird feeder design as disclosed herein.

DETAILED DESCRIPTION

Figure 2B:
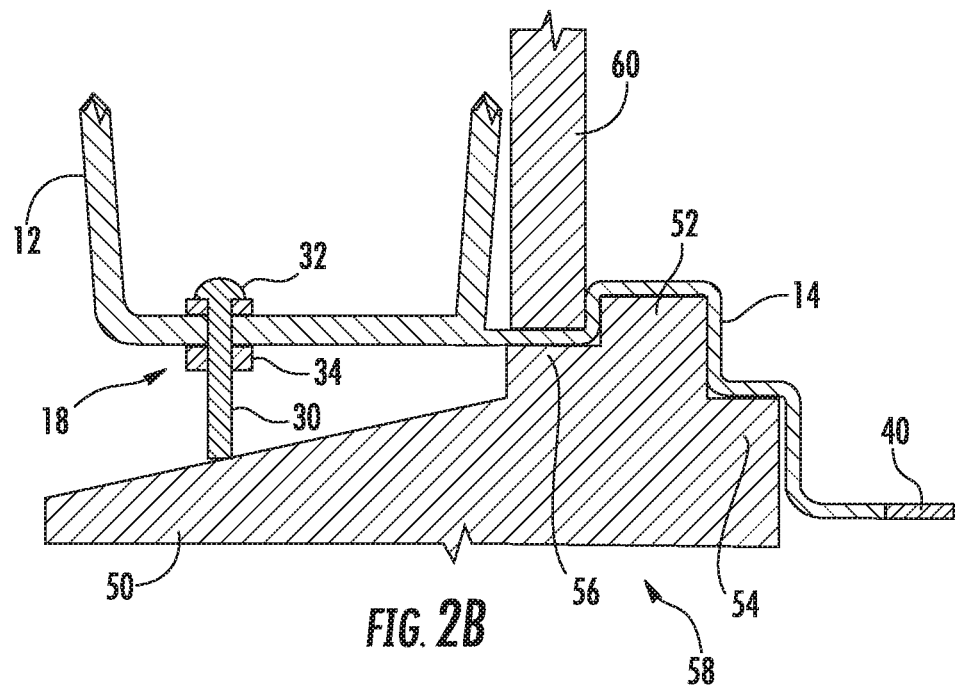
FIG. 2A is a perspective view of a bird feeder design as disclosed herein installed in a window sill, with FIGS. 2B and 2C showing cross-sectional views of FIG. 2A.

Provided herein are window bird feeders configured to be secured in and through a window frame and rest on an outside window sill. In some embodiments the bird feeders provided herein can be made of clear plastic or other suitable material as disclosed herein, have a rectangular or oval shaped basin, and a peaked or elliptical cover/roof extending upward from the basin and attached to the basin at the two narrow ends. The basin can be configured to be filled with bird seed from inside the house. To eat, birds can land upon the upper edges of the basin, or they may sit inside the basin itself. A compression pad made of marine vinyl, marine cloth, silicone, or other suitable material as disclosed herein, can be affixed in a horizontal position flat against the bottom of the basin. The outer portion of the basin can in some embodiments be supported by one or more adjustable support members to accommodate the outer slope of various outside window sills in order to insure that the basin sits in a level position and provide further support to the outer portion of the basin. The stationary compression pad can be configured to hold the feeder in the window by closing the lower sash onto the compression pad (which sits in the bottom track of the window), such that by the window compressing down upon the pad and then being locked, the feeder is secured into place in the window. The basin sits outside the window resting on the outer sill, with only the inner portion of the compression pad extending into the house or structure. To fill the feeder, one need only to hold onto the portion of the compression pad that is sitting on the inner window sill, unlock and open the window, and pour bird feed into the basin. Then, while still holding onto the inside portion of the compression pad, the window is lowered onto the pad and locked in place. Because the feeder sits directly against the outside of the window, it allows for maximum enjoyment of all facets of the art of bird watching.

The presently disclosed bird feeder designs overcome problems and challenges not addressed by current designs. For example feeders that do not mount to or near a window do not allow for "up-close" viewing of birds while they eat. Feeders not configured to mount to a window can in some instances be limited in mounting locations close to windows, particularly for upper floors. If the feeder is a distance from the window it can be difficult to hear the birds singing from a distance. In addition, such feeders make it difficult or impossible to view and appreciate the anatomical and behavioral nuances, coloration and beauty, feather configurations, body-shape variations and other anatomical features of each different bird species. The disclosed bird feeder design is configured to mount in a window frame and therefore allows for the viewing of birds up-close and from inside the house.

Additionally, the use of a compression pad on the bird feeder can allow a user to pull the feeder inward as the window is closing, thereby mounting the feeder very near or against the outer glass of the window. This is as close as a feeder can possibly get without being inside the house or structure. With such a configuration the birds are only a few inches from the window glass. In such proximity the birds can be heard singing with the only small impediment to hearing at full volume being the glass of the window. Moreover, all of the additional anatomical features discussed above can be readily seen and enjoyed when the birds are this close to the clear window as fostered through use of the instant configuration.

A problem with feeders designed with suction cups to be mounted on glass is that the suction cups may release from the window causing the feeder to fall and become damaged, or to cause injury to passersby. This problem is compounded for those living on the second or higher floors of a building. This problem is solved by the presently disclosed feeder since no suction cups are needed. Instead, the feeder is held in place by the closing of the window onto the compression pad and then locking the window latch. Thus, the feeder is held securely in place by the locked window.

Current feeder designs, including those configured to attach to a window via suction cups, can be difficult to easily and safely install. For suction cup feeders, when there is no access or difficult access from outside (e.g., upper story of building, inclement weather, etc.) and one wishes to install a suction cup feeder on the upper sash of a double hung window, one has to open the upper sash, lean out the opening, place his or her body weight against the window and contort his or her body to be able to apply inward pressure against the upper glass to get the suction cups to adhere. Installing in this awkward position creates a risk of falling by leaning too far, or by the window giving way under the installers body weight. Lastly, there is the risk of injury (especially if older windows) by pushing too hard on the glass to affix the suction cups and thereby breaking the glass.

Moreover, it can be difficult to install suction cup feeders to the lower sash from inside the house because the window can only be opened a few inches since there has to be enough space on the outside of the lower window sash for the feeder to sit on it without it hitting the upper (i.e. outer) sash when the window is pushed upward to open. This leaves very little space at the bottom of the open window for the installer to lean out and contort his or her body to apply sufficient inward pressure against the glass so the cups adhere.

If installing on the upper or lower sash by using a ladder outside, there is a risk of dropping the feeder and/or a risk of falling from the ladder by losing balance when pushing against the window to attach the suction cups. Also, installation in the winter months may be difficult or impossible due to inclement weather.

The above problems are even more of a concern for those with limited mobility, such as the elderly, infirm or handicapped.

Ease of installation, and secure installation, are also problems with tension feeders and in-house feeders. Tension feeders are designed to be held in place by tension rods spanning the outside window frame. However, such feeders tend to be large, heavy and unwieldy. Some are made of wood, metal and plastic, and weigh several pounds. With such designs there is a risk of dropping it out the window onto whatever is below, including passersby, while trying to maneuver the unit into place, and trying to hold onto it while adjusting the tension rods to fit the window frame. The risks of dropping such a unit while using a ladder are greater due to the bulkiness, weight and unwieldy nature of these feeders. Those with limited mobility or strength will also find such feeders very difficult to install.

So called in-house feeders have a vertical panel configured to sit in the window track directly under the window. The panel extends the entire width of the window, and is attached perpendicularly to the feed basin. The feeder is held in place by closing the window down upon the top of the panel. The remainder of the unit (feed basin) extends into the house or structure. Such a configuration presents its own challenges of installation, including risk of dropping the unit out the window and safely securing the unit in an unlocked window. These installation challenges and safety risks are overcome by the present bird feeder design. Particularly, the presently disclosed bird feeder design can be installed quickly, easily and safely in any type of weather and at any level of the building by simply opening the window, setting the feeder on the exterior window ledge, closing the window onto the compression pad and then locking the window. All this is done while standing safely on the floor inside the house or structure. While the window is being opened, the unit is maintained safely in place by the user holding onto the pad which sits on the interior window sill. Since the unit is lightweight and supported on the outside window ledge by the leveling screws/adjustable support members, the pad can be held in place with minimal effort, making it simple for even those with infirmities to do so.

Safely maintaining suction cup and tension feeders can also be a challenge. For suction cup feeders the same difficulties applicable to upper or lower sash installation discussed above apply to the maintenance of such feeders. Suction cup feeders need to be detached from the window to remove stale or wet food, or uneaten shells, requiring climbing a ladder or leaning out the window and applying pressure outward to remove the suction cups. This leads to a risk of falling or dropping the unit. The feeder also needs to be removed to wash it with the same risks. It then needs to be reinstalled with the same risks mentioned above. Finally, the same issues and risks come into play when the feeder is to be refilled with bird feed/seed.

In winter months to clean, wash, refill or otherwise maintain first floor suction cup feeders requires either leaning out the window as discussed above, or going outside and possibly using a ladder (depending upon height of feeder) in potentially slippery or otherwise uncomfortable conditions. For those with limited mobility, this may be an impossible task.

Owners of tension feeders need to be careful to avoid applying pressure on the unit while removing unwanted seed because they could dislodge the tension rods causing the feeder to fall onto passersby or whatever is below. This could also break the unit. To clean it out thoroughly may require complete removal, with the same risks of falling or dropping the unit as discussed above.

The presently disclosed feeder designs solve these maintenance issues. The disclosed feeders are lightweight and easily cleaned by holding onto the compression pad, opening the window, and bringing the feeder inside to dump the seed or clean the unit from the safety and comfort of one's home. While the window is being opened, the unit is maintained safely in place by the user simply holding onto the compression pad which sits on the interior window sill.

Moreover, the presently disclosed feeder design facilitates easy filling/re-filling with bird seed/feed. The disclosed feeder can be easily filled by holding onto the compression pad, opening the window, and pouring seed into it while it is still in place in the window. This overcomes those issues of safety and discomfort discussed above. There is very limited risk to the user in installing, filling or maintaining the disclosed feeders. The only risk of the unit falling would be if the user somehow let go of the compression pad, which is highly unlikely since there is a large surface to hold on to and the unit is very light and is supported by the leveling screws on the exterior window ledge. In some embodiments a clamp or fastening device can be provided to secure the pad to the window ledge, in some embodiments temporarily, while a user has the window open to access the feeder. Additionally, the large opening between the top of the basin and the bottom of the elliptical or peaked cover of the disclosed feeder design allows for easy access to the feeder basin while the feeder is installed. Moreover, the large-capacity basin reduces the need for frequent refills.

There also exists a problem with the security of the attachment of suction cup feeders and tension feeders. Both of these feeder designs suffer from potentially insecure attachments with the risk of falling units. For example, suction cup feeders can come loose and fall when the suction releases, when heavy birds use them, or when birds competing for feeding position dislodge them, or when squirrels jump onto them. Moreover, in cold or wet weather, suction cup feeders are more difficult to affix and keep in place due to the effects of the cold (or moisture from dew or rain) on the window and on the suction cups. For example, the rubber cups become more brittle in cold weather. Likewise, for tension feeders there is no stop mechanism on the sides of the window frame under the ends of the tension rods for the ends of the tension rods to sit in. Thus, the tension feeders can slide down causing instability in the feeder and a risk of falling. This is most pronounced with the tension feeders of heavy construction.

This concern with instability and insecurity of attachment is overcome by the present design. The compression and locking of the window down upon the compression pad holds the lightweight feeder securely against the window, thereby obviating risk of falling. Still yet, the disclosed feeder is further supported and stabilized by the two adjustable leveling screws/support members, which allow one to adjust the height of the outer part of the feeder so it sits level and directly on the outer part of the window ledge. This allows it to be adjusted to match the slope of various exterior ledges. Once adjusted and the screws tightened, this design provides support to the outer portion of the feeder, thereby further stabilizing the entire unit. Indeed, the support of the inside of the feeder from the compression pad and the outside from the leveling screws/adjustable support members have been demonstrated to withstand the weight of a squirrel with no problem.

Another problem encountered by existing bird feeders is that many larger birds cannot use them due to size constraints. For example, most suction cup feeders are rather small and have a small seed reservoir, due to the inability of the suction cups to hold heavy weight, which limits the ability of larger birds, e.g., morning doves, woodpeckers, blue jays, or similar larger species, to utilize them. Moreover, suction cup feeders can become dislodged by the weight and actions of larger birds in struggling to maintain stability or jockeying for position while attempting to eat. Likewise, many of the tension feeders and in-house feeders have a small bird entrance hole, which also limits access for larger birds. Or, if larger birds are able to gain access, the small hole makes it more difficult for them to exit which could lead them to struggle and become injured.

In contrast, the presently disclosed bird feeder designs include an oversized tray for holding the seed/bird feed, with an arched or peaked roof structure configured at a height above the oversized tray to provide a generous opening through which larger birds can access the seed/bird feed and comfortably utilize the feeder. Another advantage of the oversized basin is the ability to use any type of loose seed. This is in contrast to some feeders with small openings that limit the size and type of bird seed/feed. Because of its large, open basin, the presently disclosed feeder even allows for use of cylindrical or rectangular-shaped suet or other compressed feed blocks, or square suet or other compressed feed blocks which are easily cut to fit into the basin. The most efficient use of compressed feed blocks for the feeder would be through the embodiment which includes a compressed block that will be provided with the basin in the exact, or substantially similar, length, width and/or height dimensions of the inside of the basin. Thus, no space is wasted since the entire length and width of the basin is filled with this single solid block of compressed seed. In some aspects a compressed feed block or the like can also be affixed, secured or glued into place in the basin as desired.

The large, open basin also permits use of any other type of food which birds will eat, such as pieces of fruit, peanuts, etc. As such, the foregoing allows the user to choose the species of birds that he or she wishes to view by utilizing the type of feed that each particular species prefers and to change same at will, thereby permitting complete variety and flexibility in his or her bird watching activities. In some embodiments the large open design of the basin also permits the user to fill it with water for use as a bird bath or with nesting material, either loose or inside a box or other container, for use as a bird house.

Another problem with existing bird feeder designs is excessive waste/spillage of seed/bird feed. For example, suction cup feeders typically have a shallow seed reservoir. Thus, seed is displaced by the birds' normal feeding behaviors. This seed spills onto the ground and is wasted. Vertical cylinder type feeders utilize multiple small perches and feeding ports. The effects of gravity coupled with the birds' normal feeding behaviors results in unnecessary spillage of seed. In addition to wasting seed/bird feed, the spilled seed/bird feed creates an unsightly mess necessitating clean up, and if not cleaned up can attract rats, mice, skunks, raccoons and other nuisance animals.

This problem is significantly reduced by the disclosed bird feeder designs by providing a deep basin which catches and holds the bulk of the seed that is naturally displaced when the birds eat. In the embodiments including the single compressed block of seed that fits inside the basin, spillage is even less than with loose seed.

Another problem with currently existing tension feeders and in-house feeders is their large, heavy, and obtrusive size, and their concomitant expensive cost. The design of these feeders can make them unwieldy and obtrusive in a window opening. This also increases the cost and complexity of use. Such issues are not present in the disclosed bird feeder designs since they can in some embodiments be constructed of a clear plastic material or other suitable material that allows a full, unobstructed view of the birds and the entire feeding process. Moreover, the feeder designs provided herein are configured to be secured in a window such that they sit at the very bottom of the window on the ledge, which gives the user a nearly full view outside the window. The simple yet effective design of the disclosed feeders also keeps costs down, particularly as compared to existing feeders.

Another concern with existing suction cup feeders is their limited seed/bird feed capacity. Since the suction cups can have a limited load capacity the size of the feed container/basin is often times limited so as to not exceed the load capacity of the suction cups. The presently disclosed feeder designs overcome this by providing two forms of support, one comprising the window locking down upon the compression pad, and the second including the adjustable support members resting upon the outer window sill. Such a design allows for a significantly larger feed basin, thereby avoiding frequent refills.

Another problem encountered by current feeder designs is that many, including typical hanging bird feeders and basin feeders, leave the seed/bird feed unprotected from the elements. In such cases the seed/bird feed can become wet from the elements causing moldy seed/bird feed, and potentially causing avian illness. The presently disclosed design provides in some embodiments a cover or roof structure while also provided adequate access from the front and back. The cover affords some protection from the elements, particularly as compared to an open basin feeder. Since the cover adjoins the short edges of the basin it can also prevent rain or snow from entering on either side. Moreover, since the bird feeder is configured to be mounted in a window sill and near or completely against the window glass, some additional protection is provided from both the window overhang and the roof eaves.

Finally, in-house feeders are difficult to secure in windows, are unstable, allow cold air to come into the house, and present a security risk. In-house feeders are configured with a vertical panel which sits in the window track directly under the window, and extends the entire width of the window. This panel is attached perpendicularly to the feed basin and lies in a horizontal position. The feeder is held in place by closing the window down upon the top of the vertical panel. The remainder of the unit (feed basin) extends into the house. Because the unit is heavy and bulky and since the window cannot be locked, the feeder is not entirely secure. Due to the weight of the feeder and its tendency to lean inward since it does not rest upon the inside window ledge, the window could easily work its way open. Also, the contact between the window and the in-house feeder is not airtight. This leads to inefficiency in heating and cooling the home or structure. It also leads to discomfort for those sitting or standing near the window because cold air (or warm air in summer) continually blows in through the numerous unsealed areas between the top of the panel and the bottom of the lower window and the sides of the panel and the window frame. The effort of some feeders to overcome this shortcoming by including foam rubber weather stripping like that used for window air conditioners is wholly insufficient. The presence of these unsealed, open areas also permits undesirable crawling and flying insects such as spiders, centipedes, mosquitoes, and flies to enter the house.

And finally, when an in-house feeder is in place the window cannot be closed or locked. This creates a security risk and makes it difficult and in most cases impossible to engage the home or facility's security system. It also creates the potential for allowing undesirable seed-seeking vermin, squirrels, mice, etc to encroach into the users' living space either inside the in-house viewing area or through the unlocked window should it open.

The presently disclosed feeder designs overcome all of these challenges since this feeder is held in place by locking the window in a fully closed position. Thus, a window with the feeder is just as secure and airtight as the window is without the feeder. Moreover, since the window is locked tight, the home or facility's security system may be fully engaged in most instances. This also allows the feeder to be used in any weather conditions, since it does not introduce inefficiency in heating/cooling or discomfort from cold or warm outside air entering the house. Thus, it can be used year round.

Turning now to the Figures, at least one embodiment of a feeder disclosed herein is depicted in FIG. 1. The feeder 10 of FIG. 1 can comprise a basin 12 with attached cover 16. A compression pad 14 can also be provided and attached to a lower surface of basin 12. Moreover, in some embodiments one or more adjustable support members 18 can be provided.

Continuing with FIG. 1, basin 12 can comprise a generally rectangular structure with a bottom 28 and four sides, including a first opposing long side 20 and second opposing long side 22, and a first opposing short side 24 and second opposing short side 26 (also referred to as rear 20, front 22, left 24, and right 26 sides). As such, basin 12 can be configured to create a trough-like structure to hold bird seed or bird feed in the interior space created by the bottom 28 and four sides 20, 22, 24 and 26. Compression pad 14 can be attached horizontally to a lower surface of basin 12 and extend in a planar direction from first opposing long side 20 (or rear side 20). In some embodiments a weight 40 can be affixed to a terminal end (distal from the basin) of compression pad 14. Cover 16, either integrated into or affixed to first opposing short side 24 and second opposing short side 26 (see below), can extend above basin 12 in a generally peaked roof-like structure, or in some embodiments a domed structure, to create a cover over basin 12 while remaining open on the front and rear portions, or first opposing long side 20 and second opposing long side 22, of basin 12. As depicted in FIG. 1, in some embodiments one or more adjustable support members 18 can be integrated into bottom 28 of basin 12.

Cover 16 as illustrated in FIG. 1 comprises two opposing vertical members 86 extending substantially vertically from first opposing short side 24 and second opposing short side 26, and two slanted members 84 adjoining at a peak to form an angled roof-like structure above basin 12. Cover 16 as illustrated in FIG. 1 extends from and is integrated into basin 12. Cover 16 extends above basin 12 to provide shelter to the interior of basin 12 and protect the contents thereof from weather and environmental elements while simultaneously allowing access to basin 12 from the front and/or rear of basin 12. The rear vertical plane of cover 16 is at least flush with or slightly set forward of the rear plane of basin 12 such that cover 16 does not interfere with or otherwise prevent the mounting of basin 12 flush against a window in an installed position. Although illustrated in a peaked or angled roof-like configuration in FIG. 1, cover 16 can be shaped or configured in any number of ways without departing from the scope of the instant disclosure, such as for example a domed or curved shape. In some embodiments cover 16 can provide additional protection from squirrels. When designed with a smooth or slippery surface, e.g. plastic material, the sloped or elliptical shape of the top can make it harder for squirrels to latch onto the feeder. Additionally, because the outer edges of cover 16 are attached directly to the outer edges of the basin, the squirrels cannot enter the feeder from the sides.

Turning now to FIG. 2A, feeder 10 is illustrated in an installed position in a window frame. Feeder 10 is secured by compression pad 14 being sandwiched (or otherwise secured) between window frame 60 and window sill 58 when window frame 60 is in a closed position. The interface 62 between window frame 60 and window sill 58 provides sufficient space for compression pad 14 even when the window is in a fully closed and locked position. This orientation of compression pad 14 in the closed window secures feeder 10 on the outside of the window and prevents it from falling. Feeder 10 is further supported by resting on window sill 58. Adjustable support members 18 can in some embodiments provide support and compensate for any slope or angle in exterior window sill ledge 50 as it extends away from the window thereby allowing the feeder to be leveled or placed in a substantially level position.

FIG. 2B provides a cross-sectional view of FIG. 2A at cross section 2B. In FIG. 2B the securement of the feeder by sandwiching compression pad 14 between window frame 60 and window sill 58 is clearly illustrated. Window frame 60 can comprise in some embodiments a window frame surrounding glass, and in some embodiments a lower sash of a double hung window that can be raised and lowered. Window sill 58 can comprise a head portion 56 upon which window frame 60 rests in a closed position, a stool portion 52 on an interior side of window frame 60, and/or an apron 54. The exterior side of window sill 58 can comprise an exterior window sill ledge 50. In some embodiments these components of window sill 58 can be made from a single unitary piece, or can be a combination of individual pieces. In some embodiments window sill 58 may have not have one or more of a head portion 56, a stool portion 52 and/or an apron 54. On the exterior portion of window frame 60, and the portion where the feeder resides in the installed position, exterior window sill ledge 50 can in some embodiments have a downward sloping or angled upper surface. It will be appreciated that windows, window frames and window sills come in many configurations and designs. The bird feeder designs provided herein are configured to work in any number of window designs provided that at least a portion of a window or window frame can be opened sufficiently to place the compression pad in the opening and then close the window to secure the bird feeder.

Continuing with FIG. 2B, feeder 10 is further supported by resting on exterior window sill ledge 50. Adjustable support member 18 can in some embodiments provide support and compensate for any slope or angle in exterior window sill ledge 50 as it extends away from the window thereby allowing the feeder to be leveled or placed in a substantially level position. Adjustable support member 18 can comprise in some embodiments bolt, screw, or other threaded member that can be configured to have an adjustable height/length. Adjustable support member 18 can comprise a threaded portion 30, a head 32 connected to threaded portion 30 and configured to rotate threaded portion 30 when turned, and/or a nut 34 configured to threadingly receive threaded portion 30. Adjustable support member 18 can in some embodiments comprise a plastic (or other suitable material) screw about one inch long, about 2 inches long, about 2.5 inches long, about 3 inches long, about 3.5 inches long, about 4 inches long or about 5 inches long, and about ¼ inch, about ½ inch, about ¾ inch or about one inch in diameter. In some embodiments where a portion of adjustable support member 18 remains inside, or sticks up inside, the basin, such as when only a portion of the support member is needed to extend below the feeder to provide a leveling means, the portion inside the basin can act as a perch for a bird to use while feeding. Adjustable support member 18 can in some embodiments be configured to extend or retract with respect to bottom 28 of basin 12. In doing so adjustable support member 18 can be adjusted or positioned so as to compensate for the slope or change in elevation of exterior window sill ledge 50 as it slopes away from the window so that basin 12 can be supported on exterior window sill ledge 50 in a level or substantially level position. In some embodiments basin 12 can comprise one, two, three, four or more adjustable support members 18, as needed to adequately support and/or level basin 12. In some embodiments the one or more adjustable support members 18 can be positioned at any suitable location on bottom 28 of basin 12. In some embodiments adjustable support members 18 can be threaded through or positioned in a small hole in bottom 28 of basin 12 and near the front corners of basin 12, i.e. corners formed by front side 22 and left side 24, and front side 22 and right side 26. The adjustability of adjustable support members 18 allows for the use of feeder 10 in any number of window and window sill configurations where the slope/angle of the window sill may vary.

Figure 2C:
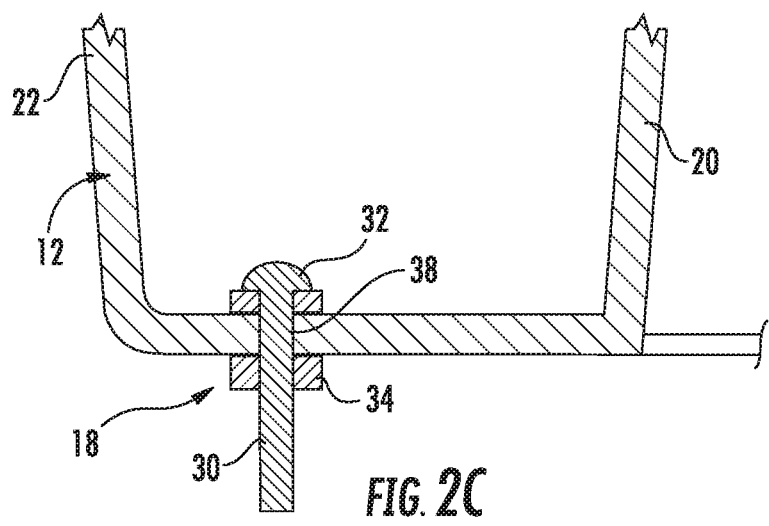

FIG. 2C provides a cross-sectional view of FIG. 2A at cross section 2C. FIG. 2C illustrates that an adjustable support member 18 can be threaded through or positioned in hole 38 in bottom 28 of basin 12. Hole 38 can comprise circular opening drilled through bottom 28 of basin 12 and of sufficient diameter to allow threaded portion 30 of adjustable support members 18 to pass there through. The positioning of hole 38 in bottom 28 of basin 12 is only exemplary in FIG. 2C, and can be placed at any desired or suitable location as discussed herein. For example, two (or more) holes 38 can be about ½ inch in diameter in the bottom 28 at the outer corners of basin 12, spaced about 10, 12 or 14 inches, centered about 1, 2 or 3 inches from sides 24, 26, and about ½, ¾, 1½, and 2 inches from front side 22. The position and/or spacing of these components in the basin can be modified and/or adjusted as needed without departing from the scope of the instant disclosure. Alternatively, in some embodiments hole 38 can comprise a threaded and reinforced opening configured as a built-in threaded nut, wherein nut 34 is integrated into bottom 28 of basin 12.

In both cross-sectional views in FIGS. 2B and 2C the integrated nature of compression pad 14 is illustrated. That is, in some embodiments compression pad 14 can be integrated into, or be an integral component of, basin 12, as opposed to be joined by a joining element or fastener. By way of example and not limitation, compression pad 14 can be injection molded or otherwise formed along with basin 12, thereby forming a single unitary component. In some embodiments compression pad 14 can be permanently secured to basin 12, such as for example through the use of an adhesive or other bonding compound.

Figure 3A:
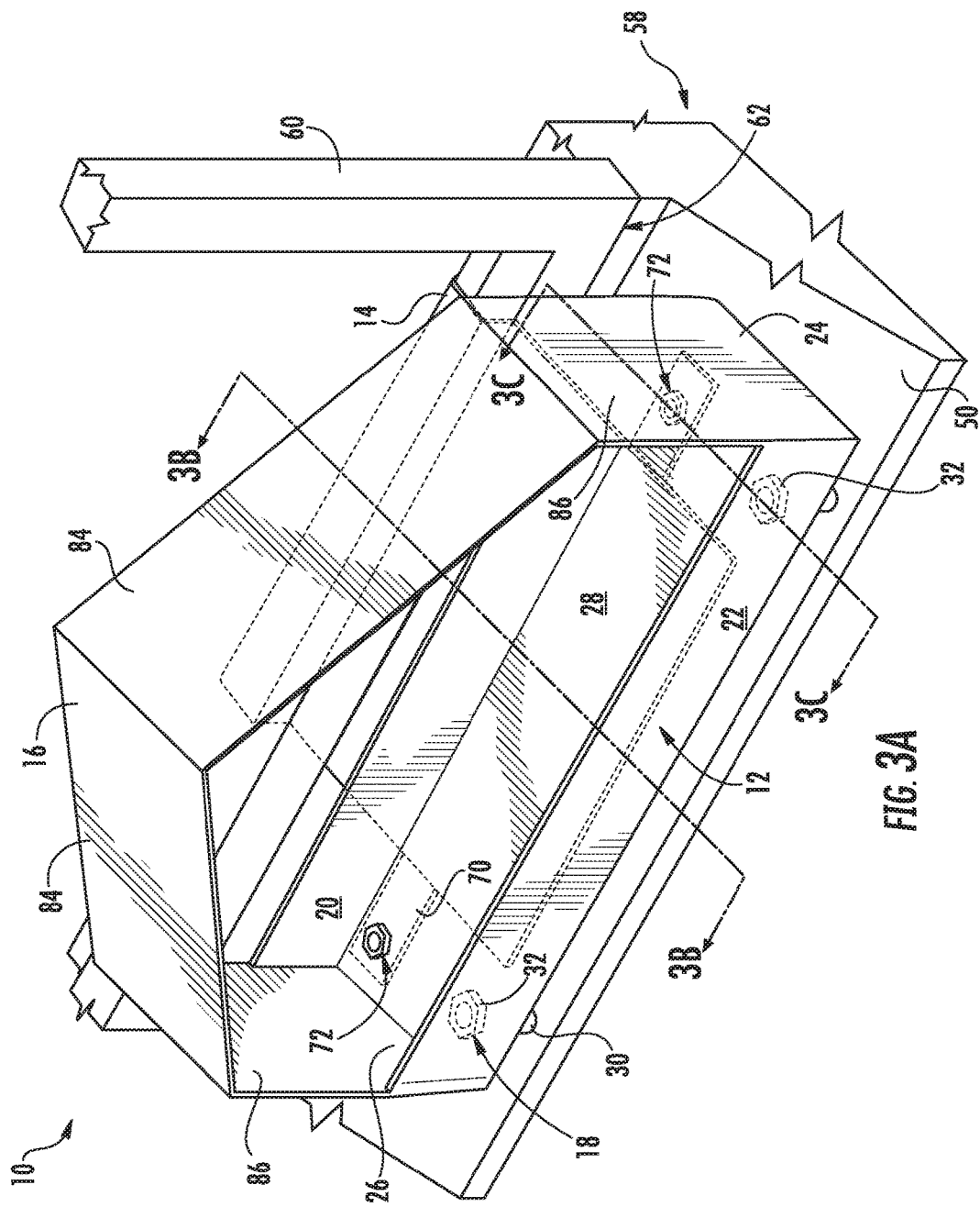
FIG. 3A is a perspective view of a bird feeder design as disclosed herein installed in a window sill, with FIGS. 3B and 3C showing cross-sectional views of FIG. 3A.

Turning now to FIG. 3A, feeder 10 is illustrated in an installed position in a window frame. Feeder 10 is secured by compression pad 14 being sandwiched (or otherwise secured) between window frame 60 and window sill 58 when window frame 60 is in a closed position. The interface 62 between window frame 60 and window sill 58 provides sufficient space for compression pad 14 even when the window is in a fully closed and locked position. This orientation of compression pad 14 in the closed window secures feeder 10 on the outside of the window and prevents it from falling. Feeder 10 is further supported by resting on exterior window sill ledge 50. Adjustable support members 18 can in some embodiments provide support and compensate for any slope or angle in window sill 50 as it extends away from the window, thereby allowing the feeder to be leveled or placed in a substantially level position.

Figure 3B:
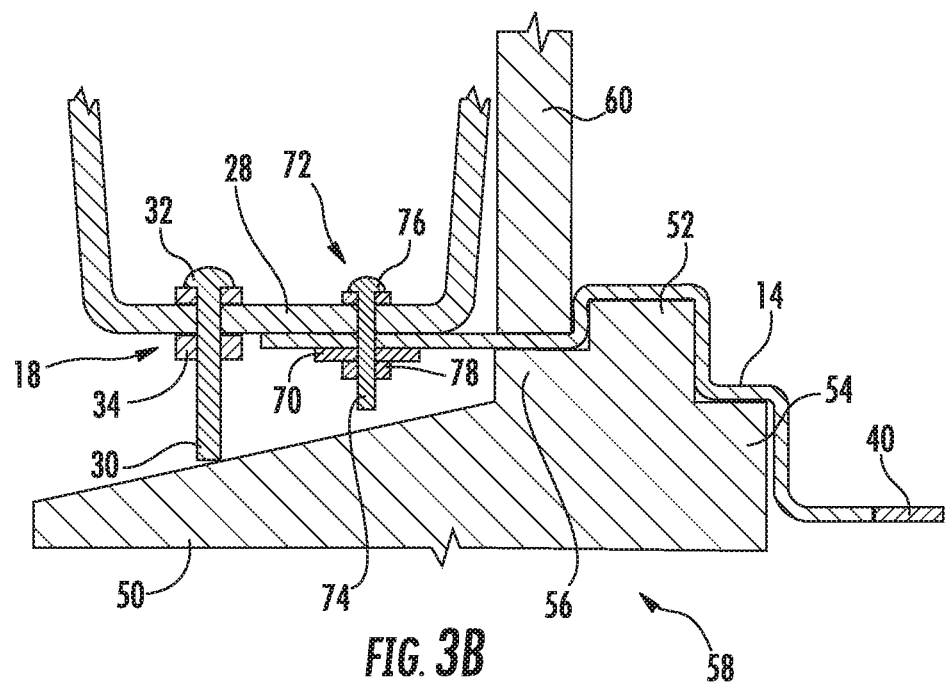

FIG. 3B provides a cross-sectional view of FIG. 3A at cross section 3B. In FIG. 3B the securement of the feeder by sandwiching compression pad 14 between window frame 60 and window sill 58 is clearly illustrated. Window frame 60 can comprise in some embodiments a window frame surrounding glass, and in some embodiments a lower sash of a double hung window that can be raised and lowered. Window sill 58 can comprise a head portion 56 upon which window frame 60 rests in a closed position, a stool portion 52 on an interior side of window frame 60, and/or an apron 54. On the exterior side window sill 58 can comprise an exterior window sill ledge 50. In some embodiments these components of window sill 58 can be made from a single unitary piece, or can be a combination of individual pieces. In some embodiments window sill 58 may have not have one or more of a head portion 56, a stool portion 52 and/or an apron 54. On the exterior portion of window frame 60, and the portion where the feeder resides in the installed position, exterior window sill ledge 50 can in some embodiments have a downward sloping or angled upper surface. It will be appreciated that windows, window frames and window sills come in many configurations and designs. The bird feeder designs provided herein are configured to work in any number of window designs provided that at least a portion of a window or window frame can be opened sufficiently to place the compression pad in the opening and then close the window to secure the bird feeder.

Continuing with FIG. 3B, feeder 10 is further supported by resting on exterior window sill ledge 50 of window sill 58. Adjustable support member 18 can in some embodiments provide support and compensate for any slope or angle in exterior window sill ledge 50 as it extends away from the window. Adjustable support member 18 can comprise in some embodiments bolt, screw, or other threaded member that can be configured to have an adjustable height/length. Adjustable support member 18 can comprise a threaded portion 30, a head 32 connected to threaded portion 30 and configured to rotate threaded portion 30 when turned, and/or a nut 34 configured to threadingly receive threaded portion 30. Adjustable support member 18 can in some embodiments comprise a plastic (or other suitable material) screw about one inch long, about 2 inches long, about 2.5 inches long, about 3 inches long, about 3.5 inches long, about 4 inches long or about 5 inches long, and about ¼ inch, about ½ inch, about ¾ inch or about one inch in diameter. Adjustable support member 18 can in some embodiments be configured to extend or retract with respect to bottom 28 of basin 12. In doing so adjustable support member 18 can be adjusted or positioned so as to compensate for the slope or change in elevation of exterior window sill ledge 50 as it slopes away from the window so that basin 12 can be supported on exterior window sill ledge 50 in a level or substantially level position. In some embodiments basin 12 can comprise one, two, three, four or more adjustable support members 18, as needed to adequately support and/or level basin 12. In some embodiments the one or more adjustable support members 18 can be positioned at any suitable location on bottom 28 of basin 12. In some embodiments adjustable support members 18 can be threaded through or positioned in a small hole in bottom 28 of basin 12 and near the front corners of basin 12, i.e. corners formed by front side 22 and left side 24, and front side 22 and right side 26, or may be positioned just beyond the center line of the basin running from side to side. The adjustability of adjustable support members 18 allows for the use of feeder 10 in any number of window and window sill configurations where the slope/angle of the window sill may vary.

Figure 3C:
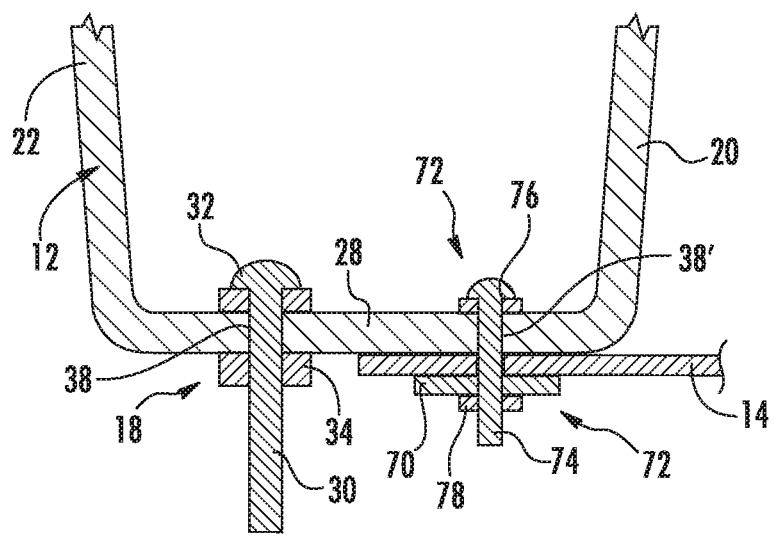

FIG. 3C provides a cross-sectional view of FIG. 3A at cross section 3C. FIG. 3C illustrates that an adjustable support member 18 can be threaded through or positioned in hole 38 in bottom 28 of basin 12. Hole 38 can comprise circular opening drilled through bottom 28 of basin 12 and of sufficient diameter to allow threaded portion 30 of adjustable support members 18 to pass there through. The positioning of hole 38 in bottom 28 of basin 12 is only exemplary in FIG. 3C, and can be placed at any desired or suitable location as discussed herein. For example, two (or more) holes 38 can be about ½ or ¾ inch in diameter in the bottom 28 at the outer corners of basin 12, spaced about 12 inches, centered about 2 inches from sides 24, 26, and about ¾ inch from front side 22. Alternatively, in some embodiments hole 38 can compromise a threaded and reinforced opening configured as a built-in threaded nut, wherein nut 34 is integrated into bottom 28 of basin 12.

In both cross-sectional views in FIGS. 3B and 3C the attachment of compression pad 14 to basin 12 is illustrated. As opposed to the integrated version depicted in FIGS. 2A, 2B and 2C, the embodiment of FIGS. 3A, 3B and 3C includes a compression pad 14 affixed to basin 12 by one or more attachment elements. In FIGS. 3B and 3C attachment element 72 comprises a screw or bolt configured to secure compression pad 14 to bottom 28 of basin 12. Attachment element 72 can in some embodiments comprise a threaded portion 74, a head 76 and a nut 78. In some embodiments plate 70 (see FIG. 3A) can comprise a planar or strip-like element configured to further position and secure compression pad 14 in place. Plate 70 can comprise a flat plastic plate (or metal or other suitable material) about 12 inches long, about one inch wide, and about $3/16$ inch thick. In some embodiments plate 70 can comprise pre-drilled threaded reinforced $3/16$ inch (or other suitable size such as about $1/8$, $1/4$, $1/2$ or $3/4$ inch, etc.) diameter holes configured as built-in threaded nuts, such that nut 78 would be incorporated into plate 70. Attachment element 72 can in some aspects comprise a plastic screw (or metal or other suitable material) about $3/4$ inch long by about $3/16$ inch in diameter (or other suitable size such as about $1/8$, $1/4$, $1/2$ or 1 inch long by about $1/8$, $1/4$, $1/2$, $3/4$ or 1 inch in diameter, etc.). Threaded portion 74 can pass through openings 38' in basin 12, and alternatively in some embodiments through compression pad 14, and nut 78 can threadingly engage threaded portion 74 to join basin 12 and compression pad 14. Openings 38' can in some embodiments be about $1/4$ inch in diameter in the inner corners, about 5.5 inches apart, centered about 2.5 inches from sides 24, 26 of the basin 12, and about $3/4$ inch from rear 20 of basin 12. In some aspects plate 70 can be sandwiched between compression pad 14 and nut 78 to provide a larger surface area against which nut 78 can compress compression pad 14 against basin 12. In embodiments in which a built-in threaded nut is incorporated into plate 70, the larger surface area provided by the plate is brought to compress upon the pad by tightening attachment element 72 into the threaded nut of plate 70. In some embodiments one, two, three, four or more attachment elements 72 can be provided. In some embodiments, and as depicted in FIG. 3A, plate 70 can extend from one attachment element 72 to another. Attaching compression pad 14 as depicted in FIGS. 3A, 3B and 3C allows the compression pad to be removable and/or adjustable as needed, except an embodiment in which threaded portion 74 passes through openings 38' in basin 12 and compression pad 14 and nut 78 threadingly engages threaded portion 74 to join basin 12 and compression pad 14. In some aspects such a configuration can allow for a worn compression pad to be replaced or modified, or to be adjusted in length inward or outward to compensate for longer or shorter exterior or interior window sills.

Basin 12 can, in any of the embodiments herein, comprise basin with an attached (integral) or detachable cover 16. In some embodiments cover 16 can extend about 3 inches, about 4 inches, about 5 inches, about 6 inches, about 7 inches, about 8 inches, about 9 inches or about 10 inches above basin 12. The height and/or size of the opening between basin 12 and cover 16 can be any suitable size sufficient to allow birds to access the interior of the basin to feed and a user to access the interior of the basin to refill with bird seed/feed and maintain the feeder.

Basin 12 can be provided in various sizes and dimensions, such as for example about 10 inches, about 12 inches, about 14 inches, about 16 inches, about 18 inches, or about 20 inches long, by about 2 inches, about 3 inches, about 4 inches, or about 5 inches wide, by about 1 inch, about 2 inches, about 3 inches or about 4 inches high. Basin 12, as well as cover 16 can be made of a plastic, in some embodiments a clear plastic, a polymer, a metal, a ceramic, glass, terra cotta or clay, wood, coated fabric, fabric or basket material (e.g., with a plastic or similar hard material as an interior liner), or any other suitable material. In some embodiments basin 12 and cover 16 comprise about $1/16$ inch, about $1/8$ inch or about $1/4$ inch thick clear plastic. These components, as well as others, can in some embodiments be injection molded, blow molded, 3D printed, poured, crafted/handcrafted, carved, dipped, woven, or made by other suitable manufacturing method.

Compression pad 14 can comprise any suitable material, including but not limited to marine cloth, marine vinyl, silicone, plastic, leather, fabric, mesh or similar netting, yarn, twine, malleable metal, rubber, oil cloth, or any other similar and/or pliable material. Suitable materials are those that are pliable enough to be compressed between a window frame and window sill, yet strong enough to hold the feeder in position. Compression pad 14 can be provided of any suitable length and/or width and/or thickness, so long as it is sufficiently sized to be compressed or secured between a closed window frame and the window sill. For example, compression pad 14 can be about 10 inches, about 11 inches, about 12 inches, about 13 inches, about 14 inches, about 15 inches, about 16 inches, about 17 inches or about 20 inches long, by about 6 inches, about 7 inches, about 8 inches, about 9 inches or about 10 inches wide, with a thickness of about $1/64$ inches, $1/32$ inches or about $1/16$ inches.

In some embodiments the compression pad may consist of two, three or more separate strips of material rather than a single strip pad. Such strips would be affixed in the same or similar fashion as the single strip pad would be and would function in a similar fashion. Such strips can in some embodiments be about 1 inch wide each, about 2 inches wide each, or more.

In some embodiments compression pad 14 can further comprise a weight 40 at a terminal end that resides inside the house when in the installed position. Weight 40 can be configured to hold compression pad 14 against the interior window sill and wall, and retain it in place until moved by a user. Weight 40 can comprise a metal bar for example, and can be sewn into the material of compression pad 14 or otherwise affixed to compression pad 14 or a medallion-like object affixed to the pad. In some embodiments where the material of compression pad 14 is a sufficiently pliable material, weight 40 may not be necessary and can be optional. Also, without such weight, one embodiment could permit the terminal end to be cut to a length to allow it to drape on the inside window sill in a manner preferred by the user.

As depicted in FIGS. 1, 2A and 3A, cover 16 can be integrated into basin 12. Alternatively, as illustrated in FIG. 4, cover 16' can be a separate or modular piece that can be affixed to basin 12 as needed or desired. Feeder 10 can be used with or without cover 16' as the conditions, e.g. location used, weather, season, etc. dictate. In the embodiment shown in FIG. 4 cover 16' comprises two opposing vertical members 86 and two slanted members 84 adjoining at a peak to form an angled roof-like structure. Two opposing vertical members 86 further comprise holes or attachment points 80 configured to align with corresponding holes or attachment points 82 in first opposing short side 24 and second opposing short side 26 of basin 12. To affix detachable cover 16' to basin 12 cover 16' can be fitted over basin 12 such that holes 80 align with holes 82, whereby bolts 90 (or other suitable attachment element) can pass through and the aligned holes and threadingly engage nuts 92 to thereby secure cover 16' with basin 12. Alternatively, the aligned holes 82 may be pre-threaded so as to obviate the need for the use of nuts to affix the cover 16'.

In some embodiments feeder 10 as depicted in the figures can be provided as a kit. The kit can comprise one or more of basin 12, compression pad 14, cover 16 (affixed or detachable), adjustable support member 18, attachment element 72, plate 70, and one or more additional attachment elements as needed. Such a kit can further comprise instructions for assembling the feeder.

In some embodiments the feeders disclosed herein can be assembled and/or installed as set forth below. In some embodiments one or more adjustable support members 18 (also referred to as "leveling screws") can be inserted or threaded into hole 38. For embodiments where compression pad 14 is not integrated and is instead modular, one or more attachment elements 72 can be used to affix or secure compression pad 14 to basin 12. In some embodiments plate 70 can also be secured in place as part of affixing compression pad 14 to basin 12. Compression pad 14 can then be slid or fed into the space between the bottom of basin 12 and the top of plate 70, after which attachment elements 72 can be tightened just enough to hold compression pad 14 in place.

Once assembled, feeder 10 can be installed in a window. First, the assembled unit can be placed on the exterior window ledge with the outer adjustable support members 18 resting on the outside part of the exterior ledge 50. With the entire basin 12 resting on the ledge/sill 50, the inner portion of compression pad 14 can be placed inside the bottom track of the window frame (the metal multi-level lip onto which the window closes). If needed, the compression pad can be adjusted inward or outward and then, attachment elements 72 can be tightened such that plate 70 securely holds the compression pad 14 from moving. The portion of compression pad 14 inside the window should be held securely by the person installing the feeder (by pinching it between a thumb and fingers, or by placing the palm or side of a hand on top of the compression pad pressing it down onto the inside window sill to hold it in place) while the window is gently lowered toward a closed position until the bottom of the window is slightly below the top of feeder basin 12. Compression pad 14 can be slowly pulled inward until the inner side of basin 12 is almost touching the window, leaving a little slack which will be tightened by the closing of the window. The window can be slowly closed all the way to insure it seals and pulls any slack from the pad, thereby moving the inner wall of the basin inward until "snug" against the outside of the window. The window can be locked to insure proper placement. If necessary, while holding the compression pad, the window may be re-opened at this point in order to raise or lower the adjustable support members so the feeder is level or substantially level. The window may then be re-closed and locked. At this point the feeder is properly installed.

To attend to or fill the feeder with bird seed/feed a user should, with one hand, hold compression pad 14 while, with the other hand, unlock and open the window. It may be useful to ensure that adjustable support members 18 are still resting on the outer portion of the exterior window ledge. While still holding compression pad 14 the window can be opened sufficiently to place and pour bird seed/feed into the top of basin 12. Once the feeder is full the window can be slowly closed and locked to secure the feeder, now filled with bird seed/feed, into place. If necessary, as the window is closing, a gentle pull inward on compression pad 14 can insure the inside wall of basin 12 rests against the outside window glass once the window is completely closed. Finally, the disclosed feeder is configured such that the window can be locked to insure the feeder remains in place and for home or facility security purposes.

Thus, a significant advantage of the presently disclosed feeder designs is that to fill the feeder one need only to hold onto the portion of the compression pad that is sitting on the inner window sill, unlock and open the window, and pour bird feed into the basin with the other hand. Then, while still holding onto the inside portion of the compression pad, the window is lowered onto the pad and locked in place. A user therefore never has to leave the comfort and safety of the home or dwelling to attend to the feeder. Moreover, because the feeder sits directly against the outside of the window, it allows for maximum enjoyment of all facets of the art of bird watching.

In each of the embodiments disclosed herein, variations, alterations and/or optimizations in design and/or materials used are contemplated to be within the purview of one of ordinary skill in the art without departing from the scope of the instant disclosure. For example, the basin can in some embodiments be made of different materials, and can be of different shapes and/or sizes, as long as it fits onto the outer window sill and/or is able to be affixed to the window by use of the compression pad and/or the adjustable support members. The basin could even be wooden and of different colors (or paintable) to match the outside of a house or dwelling.

Moreover, in some embodiments the basin could have drainage holes or tiny diameter mesh as a bottom to allow water drainage, but still keep seed/bird feed in the basin. In some embodiments the basin could be configured to be surrounded by a seed drip tray, i.e. a flat projection at the bottom and on three sides (excluding the window side) of the basin with a small raised lip all around it at the outer perimeter. This would serve as both a perch for the birds and an overflow seed catch so that feed spilled out of the basin or dropped by the birds would land on this tray rather than the ground. Birds could then perch on the tray and eat this overflow seed.

As discussed herein, the compression pad can be made of any suitable material that allows the feeder to be secured on a window sill by closing the compression pad affixed thereto in a window. Moreover, the compression pad, where it is not integrated into the basin, can be affixed to the basin by any appropriate means other than the plate, such as for example affixed by screws and nuts (with no plate), pegs, rivets, cotter pins, glue, velcro, etc. Compression pad could be made of stronger moldable, malleable material, similar to a thick aluminum foil, that could be bent to conform to the shape of the grooves in the window track at the bottom of the window. Furthermore, instead of the compression pad being of uniform width which leaves an approximately 9 inch wide segment of pad on the inside window to hold on to when filling the feeder, this part could be trimmed to measure about 3 to 4 inches (just enough to hold on to) and thereby decrease the footprint of the pad that is visible from inside. In some embodiments this could be more aesthetically pleasing. If additional holding ability is sought in this embodiment consisting of a more narrow pad, two or more such pads may be attached to the basin alongside each other with or without space in between each and affixed by any of the same means employed for a single wider pad.

Figure 5A:
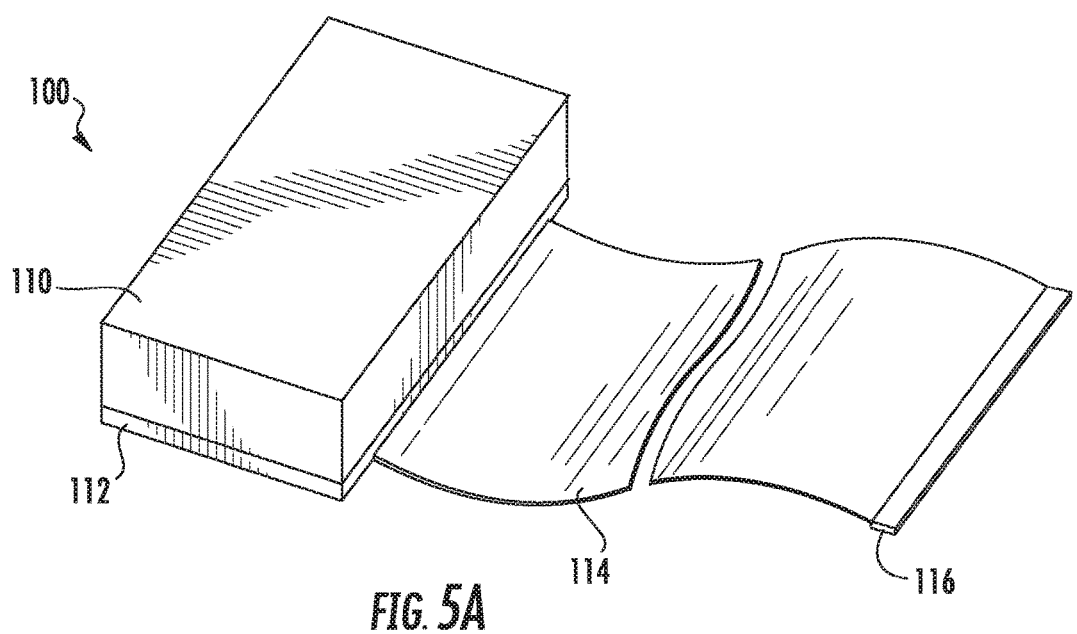
FIGS. 5A and 5B illustrate a bird feeder design as disclosed herein.
Figure 5B:
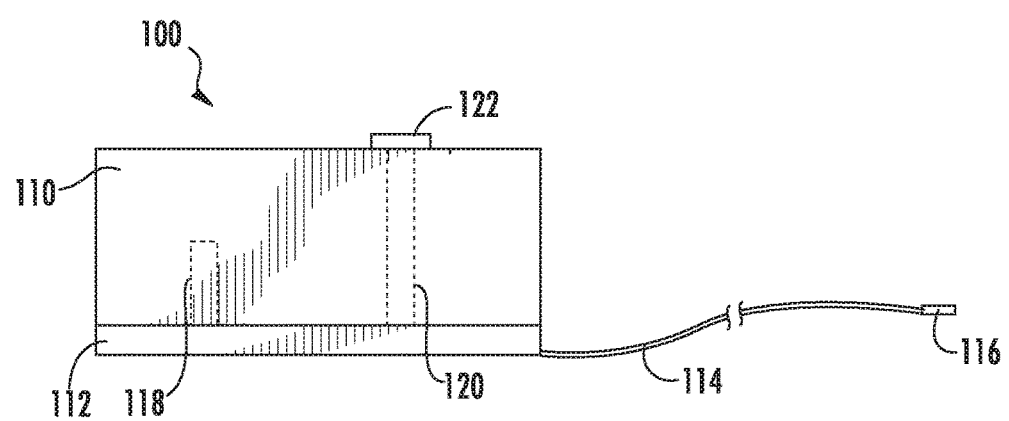

Turning now to FIGS. 5A and 5B, in some embodiments, a disposable feed block with integrated compression pad is provided. Such an embodiment utilizes a compression pad similar to the embodiments disclosed herein and illustrated in FIGS. 1-4 to secure the feed block to a window sill such that birds can freely feed on the feed block while providing a user all of the same advantages of ease of use and optimized observation of the birds. An added advantage of such an embodiment is the disposable nature or one time use of the feed block design, thereby keeping costs down and purchase price affordable.

As illustrated in the perspective view of FIG. 5A feeder 100 can comprise feed block 110 affixed to base 112 with compression pad 114 extending from a rear portion of base 112 in a substantially planar direction. In some embodiments compression pad 114 can comprise weight 116. The side view provided in FIG. 5B further illustrates optional securing elements 118 and 120 configured to secure feed block 110 to base 112. One or more securing elements 118 and/or 120 can be provided in any suitable configuration that provides a securing means to attach, affix, stabilize or otherwise hold feed block 110 in place on base 112 such that birds can feed on feed block 110 without dislodging it from base 112. By way of example and not limitation, securing elements 118 and/or 120 can comprise screws, nuts, pegs, rivets, cotter pins, velcro, etc. Where a securing element, such as securing element 120, extends all the way through the thickness of feed block 110 an affixing element 122, e.g. a nut or cap, can further be provided to hold feed block 110 in place. Alternatively, in the absence of or in addition to securing elements 118 and/or 120 feed block 110 can be affixed to base 112 by compressing the seed against base 112 or using an adhesive or glue to create a secure bond or the compression pad may be secured by any of these means directly onto the feed block without the need for a base. The intent of such an embodiment is that upon consumption of the feed block the entire unit (base, compression pad, and/or securing element) can be disposed of and replaced with a new disposable unit, or alternatively, just the block may be replaced with a new one.

In some embodiments securing elements 118 can comprise a sleeve or threaded receiving element for an adjustable support member 18 as depicted in FIGS. 2A-2C and 3A-3C. That is, in some embodiments base 112 can include one or more adjustable support members 18 threadingly engaged to securing elements 118 and adjustable in height to provide a support/leveling functionality to feeder 100.

In some embodiments base 112 can comprise sides, edges or lips extending vertically around an exterior portion of the base to thereby provide a basin to contain feed block 110. Such sides, edges or lip can be about ⅛, ¼, or ½ inch high, or any height sufficient to secure or assist in securing/containing the feed block, including, in some embodiments, up to and/or beyond the top of feed block 11. In some embodiments, base 112 could have drainage holes of various sizes and/or at various locations along the sides and/or bottom to allow water drainage. Such a configuration can effectively provide a disposable and/or reusable basin for providing a feed block.

Feed block 110 can comprise any compressed, pressed or formed feed, seed or bird feed that is edible by birds but retains a substantially solid shape until consumed by the birds. In effect, the seed is "glued" together with molasses and/or other edible material rather than being in loose form. Block 110 can comprise any desired size, shape or configuration, such as for example a square or rectangular shape. In some embodiments at least a bottom surface can be substantially planar to provide a suitable surface for securing feed block 110 to base 112 and/or to compression pad 114.

Base 112 can comprise a substantially planar or flat structure with a surface sufficient to secure feed block 110 to base 112. In some embodiments base 112 can have any desired size, shape or configuration, such as for example a square or rectangular shape, and in some embodiments can substantially match the size and/or shape of feed block 110. Base 112 can be made of any suitable material, such as for example, plastic, a clear plastic, a polymer, a metal, a ceramic, glass, terra cotta or clay, wood, coated fabric, fabric or basket material. In some embodiments a recyclable or environmentally friendly material, or material that has previously been recycled, may be desired given the possible disposable nature or one-time use of feeder 100.

The size of feed block 110 and/or base 112 can vary as desired, but generally will be a size suitable to be secured in a window frame and rest on an exterior window sill surface. Thus, by way of example and not limitation, feed block 110 and/or base 112 can be about 2, 3, 4, 5, 6, 7, 8, 9, 10, 11, 12 or more inches wide, about 2, 3, 4, 5, 6, 7, 8, 9, 10 or more inches deep. Feed block 110 can be about ½, 1, 2, 3, 4, 5 or more inches high/thick. Base 112 can be about $1/16^{th}$, $1/8^{th}$, $1/4^{th}$, $1/3^{rd}$, ½ or more inches high/thick.

Compression pad 114 can in some embodiments be the same or similar to compression pad 14 illustrated in FIGS. 1-4, and serves the same or similar function. As such compression pad 114 can comprise any suitable material, including but not limited to marine cloth, marine vinyl, silicone, plastic, leather, fabric, mesh or similar netting, yarn, twine, malleable metal, rubber, oil cloth, or any other similar material. Suitable materials are those that are pliable enough to be compressed between a window frame and window sill, yet strong enough to hold the feeder in position. Compression pad 114 can be provided of any suitable size and/or length so long as it is sufficiently sized to be compressed or secured between a closed window frame and the window sill. For example, compression pad 114 can be about 10 inches, about 11 inches, about 12 inches, about 13 inches, about 14 inches, about 15 inches, about 16 inches, about 17 inches or about 20 inches long, by about 6 inches, about 7 inches, about 8 inches, about 9 inches or about 10 inches wide, with a thickness of about $1/64$ inches, $1/32$ inches or about $1/16$ inches.

In some embodiments the compression pad 114 may consist of two, three or more separate strips of material rather than a single strip pad. Such strips would be affixed in the same or similar fashion as the single strip pad would be and would function in a similar fashion. Such strips can in some embodiments be about 1 inch wide each, about 2 inches wide each, or more.

In some embodiments compression pad 114 can further comprise a weight 116 at a terminal end that resides inside the house when in the installed position. Weight 116 can be configured to hold compression pad 114 against the interior window sill and wall, and retain it in place until moved by a user. Weight 114 can comprise a metal bar for example, and can be sewn into the material of compression pad 114 or otherwise affixed to compression pad 114 or a medallion-like object affixed to the pad. In some embodiments where the material of compression pad 114 is a sufficiently pliable material, weight 116 may not be necessary and can be optional. Also, without such weight, one embodiment could permit the terminal end to be cut to a length to allow it to drape on the inside window sill in a manner preferred by the user.

In some embodiments compression pad 114 can be integrated into, or be an integral component of base 112 and/or of feed block 110, as opposed to be joined by a joining element or fastener. By way of example and not limitation, compression pad 114 can be injection molded or otherwise formed along with base 112, thereby forming a single unitary component. In some embodiments compression pad 114 can be permanently secured to base 112 and/or feed block 110 such as for example through the use of an adhesive or other bonding compound. Alternatively, base 112 and/or feed block 110 can be secured to compression pad 114 in any manner similar to those depicted in FIGS. 3A, 3B and 3C, and described herein.

This embodiment may utilize but would not require adjustable support members (see FIGS. 1-4).

Turning now to FIG. 6, in some embodiments provided herein is a feeder with compression pad to secure to a window as discussed hereinabove and illustrated in the figures, and further comprising a hummingbird attachment. Hummingbird feeder attachment 130 as shown in FIG. 6 can in some embodiments be configured to slidingly engage cover 16 of feeder 10 (or similar feeder design as disclosed herein) and remain suspended from cover 16 so as to provide access to a feedstuff inside hummingbird feeder attachment 130. In some embodiments receiving tracks 134 can be provided (molded into or attached to) on an underside of cover 16. Receiving tracks 134 can be configured to receive and align with rails 132 on hummingbird feeder attachment 130 by sliding rails 132 into tracks 134. In some embodiments a back side of tracks 134 (nearest the side of feeder 10 facing the window in an installed position) can have a closed end or stop mechanism to prevent hummingbird feeder attachment 130 from sliding too far through tracks 134. Alternatively, instructions can be provided such that a user knows not to slide hummingbird feeder attachment 130 too far into tracks 134. Once slidingly engaged with tracks 134 hummingbird feeder attachment 130 can be suspended below cover 16 and above basin 12. Hummingbird feeder attachment 130 can be configured to work with the permanent or affixed cover as illustrated in FIG. 1, or a removable cover as illustrated in FIG. 4.

Attached to and extending below rails 132 are two opposing arms 136 connected at an opposing end to feed bowl 140. Feed bowl 140 can in some embodiments be configured to hold a liquid, such as a nectar or nectar substitute consumable by hummingbirds, and can comprise a basin 142 and removable lid 150. Lid 150 can be domed or have a outwardly curved upper surface or can have a flat upper surface 152 and a rounded front to match the rounded front 144 of basin 142. Lid 150 can comprise one or more feeding ports 162 comprising a hole or opening in lid 150 sufficient for a hummingbird to access a feedstuff, e.g. nectar, inside feed bowl 140 by inserting their beak through a feeding port 162. In some embodiments feeding ports 162 can be surrounded by a flower-like structure 160 mimicking a flower to attract a hummingbird. Feeding ports 162 can in some embodiments be located on a front portion of lid 150 and near rounded front 144 so that they extend away from cover 16 and are most accessible to a hummingbird so as to not intimidate the small birds from coming to the nectar. In some embodiments perches 170 can be molded into or attached to basin 142 near feeding ports 162 to provide a place for a feeding hummingbird to perch.

In some embodiments basin 142 and/or lid 150 can be a red color that may serve to attract hummingbirds. Moreover, in some embodiments flower-like structure 160 can also be a red color, or optionally a yellow or white color, to also attract hummingbirds.

In some embodiments basin 142 can be about 3, 4 or 5 inches wide, by about ½, ¾, 1 inch, or more, deep, by about 3, 4, 5, 6 or 7 inches long (front to back). In some embodiment the length permits the rounded front 144 where the birds feed to extend about 1 inch beyond basin 12 and/or cover 16.

The hummingbird feeder can be filled in place in the window by simply holding on to the compression pad, opening the window, lifting off the fill port 180, e.g. a small rubber "cork", which can be in the center of the house side of the red cover 150. The feeder can come with a small pouring vessel with a goose neck spout that will go into the hole of fill port 180 in the cover which can be revealed when the cork is removed. By tilting the spout, the nectar can flow into the bowl and once filled, the cork can be replaced and the window locked. Alternatively, the feeder can be removed to fill it, using a funnel or directly from a nectar bottle or by some other means, by simply holding the compression pad, opening the window, sliding the rails 132 out of the tracks 134 toward the house until they clear the tracks 134 and cover 16, closing and locking the window to secure the basin, and then bringing the entire hummingbird attachment into the house to fill it. The same process can be used to wash the hummingbird feeder or alternatively, the entire feeder 10 unit can be brought inside for washing. In embodiments which include a closed end or stop mechanism on the tracks 134, the feeder may be removed the same way for filling or washing, except it should be slid away from the house to be removed from the tracks 134

Hummingbird feeder attachment 130 will give a user the option of not filling the basin 12 with seed during hummingbird season, but rather, filling Hummingbird feeder attachment 130 with nectar to attract hummingbirds instead of seed-eating species. Correspondingly, when basin 12 is being used to feed other birds seed hummingbird feeder attachment 130 can be removed by sliding it out of tracks 134.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A bird feeder comprising:
a basin comprising at least four sides and a bottom and configured to hold bird seed;
a compression pad attached to the basin and extending from a bottom rear portion of the basin, wherein the compression pad comprises a sheet of material sufficiently flexible to be sandwiched between a closed window and a window sill yet sufficiently strong to securely hold the bird feeder in place; and
one or more adjustable support members extending from the bottom of the basin;
wherein the bird feeder is configured to rest on an exterior window sill ledge on the outside of a window, wherein the compression pad is configured to be compressed between a closed window and a window sill to thereby secure the feeder in place on the exterior window sill ledge, and wherein the one or more adjustable support members are configured to support the feeder on the exterior window sill ledge and compensate for a downward slope of the exterior window sill ledge.

2. The bird feeder of claim 1, wherein the basin comprises a rectangular structure configured as a trough structure with an interior space for holding bird seed and an open upper surface configured to allow access to the interior space.

3. The bird feeder of claim 1, wherein the basin comprises a plastic material, a polymer, a metal, a ceramic, glass, terra cotta, clay, wood, coated fabric, fabric or basket material.

4. The bird feeder of claim 1, wherein the one or more adjustable support members are integrated into the bottom of the basin, and comprise a threaded member configured to be adjustable in height.

5. The bird feeder of claim 4, wherein the bottom of the basin comprises one or more threaded openings configured to threadingly engage the one or more adjustable support members.

6. The bird feeder of claim 1, wherein the compression pad is permanently affixed to the bottom of the basin and extends in a planar direction away from a rear portion of the basin.

7. The bird feeder of claim 1, wherein the compression pad is secured to the bottom of the basin by an attachment element, wherein a length of the compression pad extending from the basin is adjustable.

8. The bird feeder of claim 7, wherein the attachment element comprises a flat plate structure extending at least the width of the compression pad and comprising threaded holes configured to receive one or more threaded bolts, wherein threaded bolts extending through the bottom of the basin and threadably received in the threaded holes of the flat plate structure together are configured to secure the compression pad against the bottom of the basin.

9. The bird feeder of claim 8, wherein the length of the compression pad extending from the basin is adjustable by loosening the one or more threaded bolts and adjusting the position of the compression pad.

10. The bird feeder of claim 7, wherein the attachment element comprises a flat plate structure extending at least the width of the compression pad and one or more bolts and nuts, wherein the flat plate structure comprises one or more holes configured to receive the one or more bolts, wherein the bottom of the basin comprises one or more holes configured to receive the one or more bolts, wherein the bolts are configured to extend through the one or more holes in the bottom of the basin and through the one or more holes of the flat plate structure and be secured by the nuts, whereby the compression pad is secured against the bottom of the basin.

11. The bird feeder of claim 10, wherein the length of the compression pad extending from the basin is adjustable by loosening the one or more bolts or nuts of the attachment element and adjusting the position of the compression pad.

12. The bird feeder of claim 1, wherein the compression pad can comprise a material selected from marine cloth, marine vinyl, silicone, plastic, leather, fabric, mesh or similar netting, yarn, twine, malleable metal, rubber, oil cloth, a pliable material and combinations thereof.

13. The bird feeder of claim 1, wherein the compression pad further comprises a weight at a terminal end of the compression pad, wherein the weight is configured to cause the compression pad to drape over the window sill on the inside of the window.

14. The bird feeder of claim 1, further comprising a cover extending above the basin and configured to allow access to the basin from a front and rear portion of the basin.

15. The bird feeder of claim 14, wherein the cover and basin are molded as a single unitary piece.

16. The bird feeder of claim 14, wherein the cover and basin are separate pieces, wherein the cover is configured to be attached to the basin.

17. The bird feeder of claim 14, wherein the cover comprises a plastic material, a polymer, a metal, a ceramic, glass, terra cotta, clay, wood, coated fabric, fabric or basket material.

18. The bird feeder of claim 14, further comprising a hummingbird feeder attachment, wherein the hummingbird feeder attachment comprises an attachment element configured to attach to the cover, a container configured to hold hummingbird food, and a feeding port configured to allow a hummingbird access to the hummingbird food.

19. The bird feeder of claim 18, wherein the hummingbird feeder attachment is configured to attach to an underside of the cover and suspend below the cover and above the basin.

20. The bird feeder of claim 18, wherein the attachment element comprises a rail configured to slidingly engage a track on an underside of the cover.

21. A bird feeder comprising:
a basin comprising at least four sides and a bottom and configured to hold bird seed;
a cover extending above the basin and configured to allow access to the basin from a front and rear portion of the basin;
a compression pad attached to the basin and extending from a bottom rear portion of the basin; and
one or more adjustable support members extending from the bottom of the basin;
wherein the bird feeder is configured to rest on an exterior window sill ledge on the outside of a window, wherein the compression pad is configured to be compressed between a closed window and a window sill to thereby secure the feeder in place on the exterior window sill ledge, and wherein the one or more adjustable support members are configured to support the feeder on the exterior window sill ledge and compensate for a downward slope of the window sill; and
wherein the basin, cover and compression pad are configured as a single unitary piece, wherein the basin and cover comprise a plastic material, a polymer, a metal, a ceramic, glass, terra cotta, clay, wood, coated fabric, fabric or basket material.

22. The bird feeder of claim 21, wherein the basin, cover and compression pad are injection molded as a single piece.

23. A bird feeder kit comprising:
a basin comprising at least four sides and a bottom and configured to hold bird seed;
a cover configured to be attachable to the basin;
a compression pad configured to be attachable to the basin;
one or more adjustable support members configured to be adjustable from the top or bottom of the basin;
hardware for attaching the cover and compression pad to the basin; and
instructions for assembling and using the bird feeder,
wherein in the assembled condition the bird feeder is configured to rest on a window sill on the outside of a window, wherein the compression pad is configured to be compressed between a closed window and the window sill to thereby secure the bird feeder in place on the window sill, and wherein the one or more adjustable support members are configured to support the bird feeder on the window sill and compensate for a downward slope of the window sill.

24. A bird feeder comprising:
a block of compressed bird seed; and
a compression pad attached to and extending from the block of compressed bird seed;
wherein the bird feeder is configured to rest on an exterior window sill ledge on the outside of a window, wherein the compression pad is configured to be compressed between a closed window and a window sill to thereby secure the bird feeder in place on the exterior window sill ledge.

25. The bird feeder of claim 24, further comprising a base to which the block of compressed bird seed is affixed, wherein the compression pad is attached to and extends from a rear portion of the base in a substantially planar direction.

26. The bird feeder of claim 25, further comprising one or more securing elements configured to secure the block of compressed bird seed to the base, wherein the securing elements extend from the base and into the block of compressed bird seed.

27. The bird feeder of claim 26, wherein the compression pad comprises a sheet of material sufficiently flexible to be sandwiched between a closed window and a window sill yet sufficiently strong to securely hold the bird feeder in place.

28. The bird feeder of claim 24, wherein the compression pad comprises a material selected from marine cloth, marine vinyl, silicone, plastic, rubber, oil cloth, a pliable material and combinations thereof.

29. The bird feeder of claim 24, wherein the block of compressed bird seed comprises feed, seed or bird feed that is edible by birds but retains a substantially solid shape until consumed by birds.

30. The bird feeder of claim 24, further comprising one or more adjustable support members extending from a bottom of the base, wherein the one or more adjustable support members are configured to support the feeder on an exterior window sill ledge and compensate for a downward slope of the exterior window sill ledge.

31. The bird feeder of claim 24, wherein the bird feeder is configured to be disposable or reusable once the bird seed is consumed.

32. A bird feeder, comprising:
a bird feeder comprising a container to hold bird feed and configured to allow birds access to the bird feed, and
a compression pad attached to and extending from the bird feeder, wherein the compression pad comprises a sheet of material sufficiently flexible to be sandwiched between a closed window and a window sill yet sufficiently strong to securely hold the bird feeder in place;
wherein the bird feeder is configured to rest on an exterior window sill ledge on the outside of a window, wherein the compression pad is configured to be compressed between a closed window and a window sill to thereby secure the bird feeder in place on the exterior window sill ledge.

33. The bird feeder of claim 32, wherein the compression pad comprises a material selected from marine cloth, marine vinyl, silicone, plastic, rubber, oil cloth, a pliable material and combinations thereof.

34. The bird feeder of claim 32, wherein the bird feeder further comprises one or more adjustable support members extending from a bottom of the bird feeder, wherein the one or more adjustable support members are configured to support the bird feeder on the exterior window sill ledge and compensate for a downward slope of the exterior window sill ledge.

* * * * *